(12) United States Patent
Jeon

(10) Patent No.: US 12,079,430 B2
(45) Date of Patent: Sep. 3, 2024

(54) DISPLAY DEVICE WITH GUARD ELECTRODE IN TOUCH SENSING REGION

(71) Applicant: Samsung Display Co., Ltd., Yongin-Si (KR)

(72) Inventor: Jinyoung Jeon, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/824,173

(22) Filed: May 25, 2022

(65) Prior Publication Data

US 2023/0054462 A1 Feb. 23, 2023

(30) Foreign Application Priority Data

Aug. 17, 2021 (KR) .................. 10-2021-0107885

(51) Int. Cl.
*G06F 3/041* (2006.01)
*G06F 3/044* (2006.01)

(52) U.S. Cl.
CPC ........ *G06F 3/04186* (2019.05); *G06F 3/0412* (2013.01); *G06F 3/0446* (2019.05)

(58) Field of Classification Search
CPC ... G06F 3/04186; G06F 3/0446; G06F 3/0412
See application file for complete search history.

(56) References Cited

U.S. PATENT DOCUMENTS

| 10,928,952 | B2 | 2/2021 | Wang et al. |
| 11,126,288 | B2 | 9/2021 | Kim et al. |
| 2020/0004368 | A1* | 1/2020 | Kim ..................... G06F 3/04164 |
| 2021/0005677 | A1 | 1/2021 | Lee et al. |
| 2021/0011602 | A1 | 1/2021 | Song et al. |
| 2021/0255737 | A1* | 8/2021 | Kida ..................... G06F 3/0445 |
| 2022/0050555 | A1* | 2/2022 | Maruyama ............ G06F 3/0445 |
| 2022/0276735 | A1* | 9/2022 | Pu ......................... G06F 3/0445 |

FOREIGN PATENT DOCUMENTS

| KR | 10-1766758 | 8/2017 |
| KR | 10-2019-0114063 | 10/2019 |
| KR | 10-2021-0003972 | 1/2021 |
| KR | 10-2021-0007062 | 1/2021 |

* cited by examiner

*Primary Examiner* — Liliana Cerullo
(74) *Attorney, Agent, or Firm* — F. CHAU & ASSOCIATES, LLC

(57) ABSTRACT

An electronic device includes a display panel including a display region and a non-display region and an input sensing member disposed on the display panel. The input sensing member includes first sensing electrodes arranged in n rows along a first direction. Second sensing electrodes cross the first sensing electrodes and are arranged in m columns along a second direction. N and m are each a natural number greater than or equal to 2. First signal lines are respectively connected to the first sensing electrodes. Second signal lines are respectively connected to the second sensing electrodes. A guard electrode is disposed along a first row first sensing electrode among the first sensing electrodes or a first column second sensing electrode among the second sensing electrodes. A guard line is electrically connected to the guard electrode. The guard electrode is electrically insulated from the first and second sensing electrodes.

20 Claims, 17 Drawing Sheets

DISPLAY DEVICE WITH GUARD ELECTRODE IN TOUCH SENSING REGION

CROSS-REFERENCE TO RELATED APPLICATIONS

This application claims priority under 35 U.S.C. § 119 to Korean Patent Application No. 10-2021-0107885, filed on Aug. 17, 2021 in the Korean Intellectual Property Office, the disclosure of which is incorporated by reference in its entirety herein.

1. TECHNICAL FIELD

The present disclosure relates to an electronic device, and more particularly, to an electronic device including an input sensor.

2. DISCUSSION OF RELATED ART

Various types of multimedia electronic devices may include display devices for displaying images, such as televisions, mobile phones, tablet computers, navigation systems, and game consoles. Electronic devices may include input sensors capable of providing a touch-based input mode that enables users to readily and intuitively enter information or commands, in addition to typical input modes such as a button, a keyboard, and a mouse.

Input sensors may detect inputs such as a touch of a user's body apart. According to the touch sensitivity of an input sensor, electronic devices may accurately recognize a user's input and provide information about the input. The touch sensitivity of an input sensor may vary depending on configurations of an electronic device and external factors, and an increased touch sensitivity is desired.

SUMMARY

The present disclosure provides an electronic device including an input sensor having increased reliability and touch sensitivity.

According to an embodiment of the present disclosure, an electronic device includes a display panel including a display region and a non-display region and an input sensing member disposed on the display panel. The input sensing member includes first sensing electrodes arranged in n rows along a first direction. Second sensing electrodes cross the first sensing electrodes and are arranged in m columns along a second direction. N and m are each a natural number greater than or equal to 2. First signal lines are respectively connected to the first sensing electrodes. Second signal lines are respectively connected to the second sensing electrodes. A guard electrode is disposed along a first row first sensing electrode that is disposed in a first row among the first sensing electrodes or a first column second sensing electrode that is disposed in a first column among the second sensing electrodes. A guard line is electrically connected to the guard electrode. The guard electrode is electrically insulated from the first and second sensing electrodes.

In an embodiment, each of the first sensing electrodes may extend along the second direction, and the guard electrode may be disposed along a boundary of the first row first sensing electrode and extends along the second direction.

In an embodiment, the guard electrode may be spaced apart from a second row first sensing electrode that is disposed in a second row adjacent to the first row among the first sensing electrodes, and the first row first sensing electrode is disposed between the guard electrode and the second row first sensing electrode when viewed in a plane.

In an embodiment, each of the second sensing electrodes may extend along the first direction, and the guard electrode may be disposed along a boundary of the first column second sensing electrode and extends along the first direction.

In an embodiment, the guard electrode may be spaced apart from a second column second sensing electrode that is disposed in a second column adjacent to the first column among the second sensing electrodes, and the first column second sensing electrode is disposed between the guard electrode and the second column second sensing electrode when viewed in a plane.

In an embodiment, the input sensing member may further include input pads overlapping the non-display region, first ends of the first signal lines may respectively be connected to first sides of the first sensing electrodes, and second ends of the first signal lines may each be connected to a corresponding input pad among the input pads. A first end of the guard line may be connected to the guard electrode. A second end of the guard line may be connected to a corresponding input pad among the input pads.

In an embodiment, the first row first sensing electrode is disposed farthest away from the input pads in the first direction than all other first sensing electrodes.

In an embodiment, a first row first signal line that is connected to the first row first sensing electrode may be disposed at an outermost side among the first signal lines, and the guard line may be disposed outside the first row first signal line.

In an embodiment, each of the first signal lines may include a line portion extending along the first direction, and the line portion of the first row first signal line may has a largest length than all other line portions of the first signal lines.

In an embodiment, at least some of the first signal lines may further include a planar portion connected to the line portion and having a predetermined planar area, and the planar portions of the at least some of the first signal lines may have different planar areas from each other.

In an embodiment, the planar portion of the first row first signal line may have a largest planar area than all other of the planar portions of the at least some of the first signal lines.

In an embodiment, a signal applied to the guard line is a same signal as a signal applied to the first row first signal line.

In an embodiment, the input sensing member may further include a dummy pattern overlapping the non-display region and disposed adjacent to the first row first signal line. The dummy pattern may be spaced apart from the first row first signal line and the guard line is disposed between the dummy pattern and the first row first signal line when viewed in a plane.

In an embodiment, the guard electrode may include a mesh pattern.

In an embodiment, the input sensing member may further include dummy patterns disposed between the first sensing electrodes and the second sensing electrodes.

According to an embodiment of the present disclosure, an electronic device includes a display panel. An input sensing member is disposed on the display panel. The input sensing member includes first sensing electrodes arranged along a first direction, and each extending along a second direction crossing the first direction. Second sensing electrodes are arranged along the second direction, and each extend along the first direction. First signal lines are respectively connected to the first sensing electrodes. Second signal lines are respectively connected to the second sensing electrodes. A guard electrode is disposed along an outermost first sensing electrode that is disposed at an outermost side in the first direction among the first sensing electrode. A guard line is electrically connected to the guard electrode. A signal applied to the guard line is a same signal as a signal that is applied to an outermost first signal line that is connected to the outermost first sensing electrode among the first signal lines.

In an embodiment, the outermost first sensing electrode may include sensor portions arranged along the second direction, and connection portions disposed on a same layer as the sensor portions. Each of the connection portions connect adjacent sensor portions. The guard electrode may be disposed along a first side of the sensor portions and the connection portions.

In an embodiment, the outermost first sensing electrode may include sensor portions arranged along the second direction, and connection portions overlapping the sensor portions when viewed in a plane. Each of the connection portions electrically connecting adjacent sensor portions. The guard electrode may include first portions disposed along a first side of the sensor portions, and second portions each overlapping adjacent first portions when viewed in a plane. Each of the second portions electrically connecting the adjacent first portions.

In an embodiment, the outermost first signal line may be disposed at an outermost side among the first signal lines, and the guard line may be disposed outside the outermost first signal line.

In an embodiment, the input sensing member may further include input pads each connected to a corresponding line among the first signal lines, the second signal lines, and the guard line, first ends of the first signal lines may respectively be connected to first side of the first sensing electrodes, and second ends may respectively be connected to the input pads, and the outermost first signal line has a largest length than all other of the first signal lines.

BRIEF DESCRIPTION OF THE DRAWINGS

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION OF EMBODIMENTS

Figure 1A:
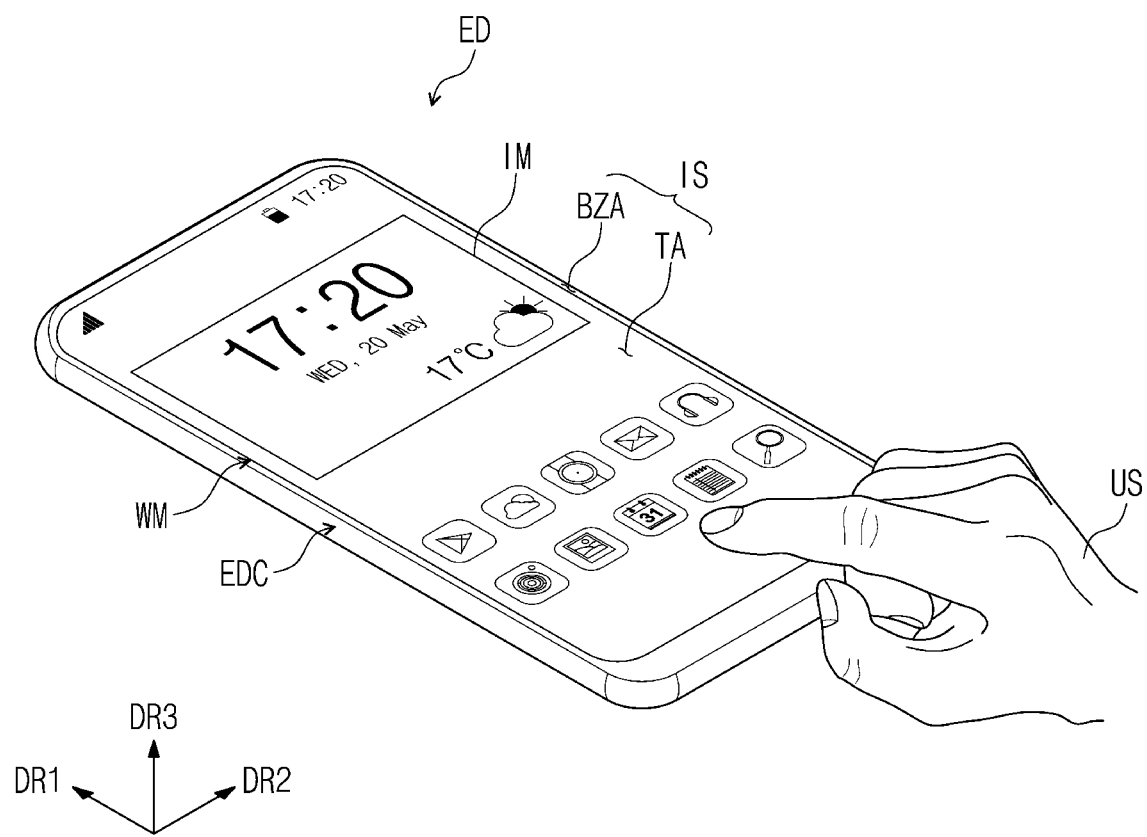
FIG. 1A is a perspective view of an electronic device according to an embodiment of the present disclosure.

Since the present disclosure may have various modifications and diverse shapes, particular embodiments are illustrated in the drawings and are described in the detailed description. However, the drawings and description do not limit embodiments of the present disclosure, and it should be understood that the present disclosure covers all the modifications, equivalents, and replacements within the idea and technical scope of the present disclosure.

In the present description, when an element (e.g., a region, a layer, a portion, etc.) is referred to as being "on," "connected to," or "coupled to" another element, it means that the element may be directly disposed on/connected to/coupled to the other element, or that a third element may be disposed therebetween. However, when an element (e.g., a region, a layer, a portion, etc.) is referred to as being "directly on," "directly connected to," or "directly coupled to" another element, it means that no third element may be disposed therebetween.

Like reference numerals refer to like elements. Also, in the drawings, the thickness, the ratio, and the dimension of elements are exaggerated for effective description of the technical contents. The term "and/or," includes all combinations of one or more of which associated configurations may define.

It will be understood that, although the terms first, second, etc. may be used herein to describe various elements, these elements should not be limited by these terms. These terms are only used to distinguish one element from another element. For example, a first element may be referred to as a second element, and similarly, a second element may be referred to as a first element without departing from the teachings of the present disclosure. The singular forms are intended to include the plural forms as well, unless the context clearly indicates otherwise.

Also, terms of "below", "on lower side", "above", "on upper side", or the like may be used to describe the relationships of the components illustrated in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Unless otherwise defined, all terms (including technical and scientific terms) used herein have the same meaning as commonly understood by one of ordinary skill in the art to which the present disclosure pertains. It is also to be understood that terms defined in commonly used dictionaries should be interpreted as having meanings consistent with the meanings in the context of the related art, and are expressly defined herein unless they are interpreted in an ideal or overly formal sense.

Hereinafter, an electronic device according to an embodiment of the present disclosure will be described with reference to the drawings.

Figure 1B:
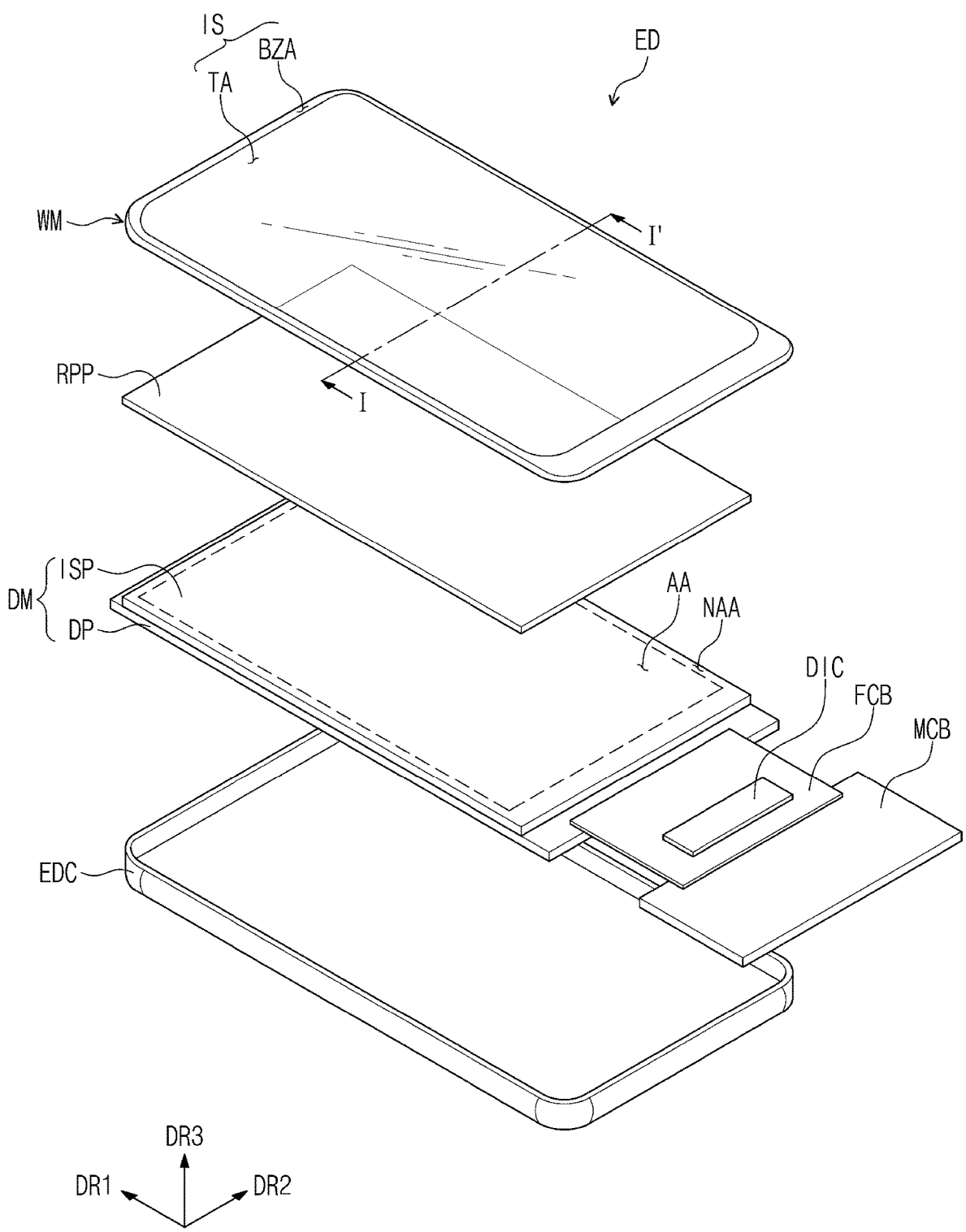
FIG. 1B is an exploded perspective view of an electronic device according to an embodiment of the present disclosure.

FIG. 1A is a perspective view of an electronic device according to an embodiment. FIG. 1B is an exploded perspective view of an electronic device illustrated in FIG. 1A.

An electronic device ED may be a device activated according to electrical signals. The electronic device ED may include various embodiments. For example, the electronic device ED may include large-sized electronic devices such as a television set and an outdoor billboard, or small- and medium-sized electronic devices such as a mobile phone, a tablet, a computer, a navigation system, and a game console. However, embodiments of the present disclosure are not necessarily limited thereto. In the present embodiment, a mobile phone is illustrated as an example of the electronic device ED.

Referring to FIG. 1A, the electronic device ED may display an image IM in a third direction DR3 through a display surface IS parallel to a plane defined by a first direction DR1 and a second direction DR2. The third direction DR3 may be parallel to a normal direction of the display surface IS. In an embodiment, the display surface IS on which the image 1M is displayed may correspond to a front surface of the electronic device ED. The image IM may include at least one still image and/or at least one dynamic image. In FIG. 1A, software application icon images, a clock, temperature, and calendar display are illustrated as an example of the image IM. However, embodiments of the present disclosure are not necessarily limited thereto.

In the present embodiment, a front surface (e.g., a top surface) and a rear surface (e.g., a bottom surface) of respective members or units may be defined with respect to the direction in which the image IM is displayed. The front and rear surfaces may oppose each other in the third direction DR3 and the normal direction of each of the front and rear surfaces may be parallel to the third direction DR3. The distance between the front surface and the rear surface defined along the third direction DR3 may correspond to a thickness of a member (e.g., a unit). However, directions indicated by the first to third directions DR1, DR2, and DR3 are relative concepts, and may thus be changed to other directions.

FIG. 1A illustrates the electronic device ED having a planar display surface IS as an example. However, the shape of the display surface IS of the electronic device ED is not necessarily limited thereto, and may be a curved shape or a three-dimensional shape.

In an embodiment, the electronic device ED may be flexible. The term "flexible" indicates a property of being bendable, and may encompass various degrees of bendability from a completely foldable structure to a structure bendable to a several-nanometer degree. For example, a flexible electronic device ED may be a curved electronic device or a foldable electronic device. However, embodiment of the present disclosure are not necessarily limited thereto, and the electronic device ED may be rigid.

The electronic device ED may detect external inputs applied from the outside. The external inputs may include various forms of inputs provided from outside the electronic device ED. For example, the external inputs may include force, pressure, temperature, light, and the like. The external inputs may include inputs applied when being in contact (e.g., contact by a user's hand or a pen) with the electronic device ED, as well as inputs applied when being close or adjacent (e.g., in proximity) to the electronic device ED by a predetermined distance such as hovering.

In an embodiment as shown in FIG. 1A, the external inputs are illustrated as touch inputs by a hand of a user US, which are applied to the front surface of the electronic device ED. However, this is presented as an example, and the external inputs may include any inputs that bring about changes in capacitance, and are not necessarily limited to any one. In addition, in the electronic device ED, a region for detecting external inputs is not necessarily limited to the front surface of the electronic device ED, and a user US input applied to a side or the rear surface of the electronic device ED may be detected depending on structures involved.

The display surface IS of the electronic device ED may be divided into a transmission region TA and a bezel region BZA. The transmission region TA may be a region in which the image IM is displayed. The transmission region TA may allow users to view the image IM. In an embodiment as shown in FIG. 1A, the transmission region TA is illustrated in a rectangular shape with rounded corners, but this is presented as an example, and the transmission region TA may have various shapes.

The bezel region BZA may be a region having a predetermined color and blocking light. The bezel region BZA may be positioned adjacent to the transmission region TA. For example, the bezel region BZA may be disposed outside the transmission region TA to surround the transmission region TA (e.g., in the first and/or second directions DR1, DR2). Accordingly, the shape of the transmission region TA may be substantially defined by the bezel region BZA. However, this is presented as an example, and the bezel region BZA may be positioned adjacent to only one side of the transmission region TA or may be omitted. In addition, the bezel region BZA may be disposed on a side surface of the electronic device ED instead of the front surface thereof.

Referring to FIGS. 1A and 1B, the electronic device ED may include a window WM and a case EDC. The window WM may be combined with the case EDC to form an exterior of the electronic device ED, and may provide an inner space for housing components of the electronic device ED. The electronic device ED may include a display module DM and an anti-reflection member RPP, which are disposed between the window WM and the case EDC.

The window WM may be disposed on the display module DM and the anti-reflection member RPP. The window WM may protect components inside the electronic device ED from external impact. The front surface of the window WM may correspond to the display surface IS of the electronic device ED described above. Accordingly, the front surface of the window WM may include the transmission region TA and the bezel region BZA described above.

In an embodiment, the transmission region TA of the window WM may be an optically transparent region. The window WM may transmit the image IM provided from the display module DM through the transmission region TA, and users may view the image IM. The bezel region BZA of the window WM may be provided as a region on which a material having a predetermined color is printed. The bezel region BZA of the window WM may prevent a configuration of the display module DM disposed to overlap the bezel region BZA from being viewed from the outside.

The display module DM may be disposed between the window WM and the case EDC. The display module DM may display images according to electrical signals, and transmit and receive information on external inputs. The display module DM may include an active region AA and a peripheral region NAA adjacent to the active region AA.

The active region AA may be a region activated according to electrical signals. The active region AA may be a region configured to emit images provided from the display module DM or detect external inputs. According to an embodiment, the active region AA of the display module DM may correspond to the transmission region TA described above. In the present description, "a region/portion corresponds to another region/portion" indicates that "the regions/portions overlap each other", and is not necessarily limited to having the same surface area and/or having the same shape. The image IM displayed in the active region AA may be viewed from the outside through the transmission region TA. In addition, external inputs input from the active region AA through the transmission region TA may be detected.

The peripheral region NAA may be adjacent to the active region AA. For example, the peripheral region NAA may surround the active region AA (e.g., in the first and/or second directions DR1, DR2). However, embodiments of the present disclosure are not necessarily limited thereto, and the peripheral region NAA may be defined in various shapes. The peripheral region NAA may be a region in which a driving circuit or driving wiring for driving the active region AA, various signal lines for providing electric signals, or pads may be disposed. The peripheral region NAA of the display module DM may correspond to the bezel region BZA described above. The bezel region BZA may prevent components of the display module DM disposed in the peripheral region NAA from being viewed from the outside.

The display module DM may include a display panel DP and an input sensing member ISP. The display panel DP may generate images, and the input sensing member ISP may acquire coordinate information of external inputs (e.g., a touch event). In an embodiment, the display module DM may include a main circuit board MCB, a flexible circuit board FCB, and a driving chip DIC.

The display panel DP according to an embodiment may be a light emitting display panel. However, embodiments of the present disclosure are not necessarily limited thereto. For example, the display panel DP may be an organic light emitting display panel, an inorganic light emitting display panel, or a quantum dot light emitting display panel. An emission layer of the organic light emitting display panel may include an organic light emitting material, and an emission layer of the inorganic light emitting display panel may include an inorganic light emitting material. An emission layer of the quantum dot light emitting display panel may include quantum dots, quantum rods, and the like. Hereinafter, the display panel DP will be described as an organic light emitting display panel for convenience of explanation.

The input sensing member ISP may be disposed on the display panel DP (e.g., disposed directly thereon in the third direction DR3). The input sensing member ISP may detect external inputs applied from the outside of the electronic device ED, and may acquire coordinate information of the external inputs. The input sensing member ISP according to an embodiment of the present disclosure may be driven in various ways. For example, the input sensing member ISP may be operated in a capacitive mode, a resistive mode, an infrared mode, a sonic mode, or a pressure mode, and is not necessarily limited thereto. In the present embodiment, the input sensing member ISP operated in a capacitive mode is described as an example.

The main circuit board MCB may be connected to the flexible circuit board FCB and electrically connected to the display panel DP. The main circuit board MCB may include a plurality of driving elements. The plurality of driving elements may include a circuit unit configured to drive the display panel DP.

The flexible circuit board FCB may be connected to the display panel DP to electrically connect the display panel DP with the main circuit board MCB. Although FIG. 1B illustrates a single flexible circuit board FCB as an example, embodiments of the present disclosure are not necessarily limited thereto, and a plurality of flexible circuit boards FCB may be provided and the flexible circuit boards FCB may each be connected to the display panel DP.

The driving chip DIC may be mounted on the flexible circuit board FCB. The driving chip DIC may include driving elements, for example, a data driving circuit, for driving pixels of the display panel DP.

The flexible circuit board FCB may be bent such that the main circuit board MCB faces a rear surface of the display module DM. In this embodiment, the main circuit board MCB may be electrically connected to another electronic module of the electronic device ED through a connector.

FIG. 1B illustrates a structure in which the driving chip DIC is mounted on the flexible circuit board FCB, however embodiments of the present disclosure are not necessarily limited thereto. For example, the driving chip DIC may be directly mounted on the display panel DP. In this embodiment, a portion of the display panel DP on which the driving chip DIC is mounted may be bent towards the rear surface of the display module DM.

The input sensing member ISP may be electrically connected to the main circuit board MCB through the flexible circuit board FCB. However, embodiments of the present disclosure are not necessarily limited thereto, and the display module DM may further include a separate flexible circuit board for electrically connecting the input sensing member ISP to the main circuit board MCB.

The anti-reflection member RPP may be disposed between the display module DM and the window WM (e.g., in the third direction DR3). The anti-reflection member RPP may reduce reflectance of external light incident toward the front surface of the electronic device ED.

The anti-reflection member RPP according to an embodiment may include a phase retarder and a polarizer. The phase retarder may include a $\lambda/2$ retarder and a $\lambda/4$ retarder. However, embodiments of the present disclosure are not necessarily limited thereto. The phase retarder and the polarizer may each be a film type or a liquid crystal coating type. The film type polarizer may include a stretchable synthetic resin film, and the liquid crystal coating type polarizer may include liquid crystals arranged in a predetermined arrangement. Embodiments of the present disclosure are not necessarily limited thereto, and the phase retarder and the polarizer may be implemented as a single polarizing film. The anti-reflection member RPP may further include a protection film disposed above or below the polarizing film.

The anti-reflection member RPP according to an embodiment may include color filters. The color filters may be disposed to correspond to an arrangement of pixels included in the display panel DP and an emission color. The anti-reflection member RPP may further include a black matrix positioned adjacent to the color filters.

The anti-reflection member RPP according to an embodiment may include a destructive interference structure. For example, the destructive interference structure may include a first reflection layer and a second reflection layer which are disposed on different layers. In an embodiment, first reflection light reflected from the first reflection layer and the second reflection light reflected from the second reflection layer may destructively interfere with each other, and accordingly, the anti-reflection member RPP may reduce the reflectance of external light.

The case EDC may be disposed below the display module DM to accommodate the display module DM. The case EDC may absorb external impact applied from the outside and prevent the penetration of foreign substances/moisture to protect the display module DM accommodated in the case EDC. In an embodiment, the case EDC may be provided in a form that includes a plurality of accommodation members that are combined.

In an embodiment, the electronic device ED may further include an electronic module with various functional modules for operating the display module DM, a power supply module for supplying power required for the electronic device ED, a bracket combined with the display module DM and/or the case EDC to divide an internal space of the electronic device ED.

Figure 2A:
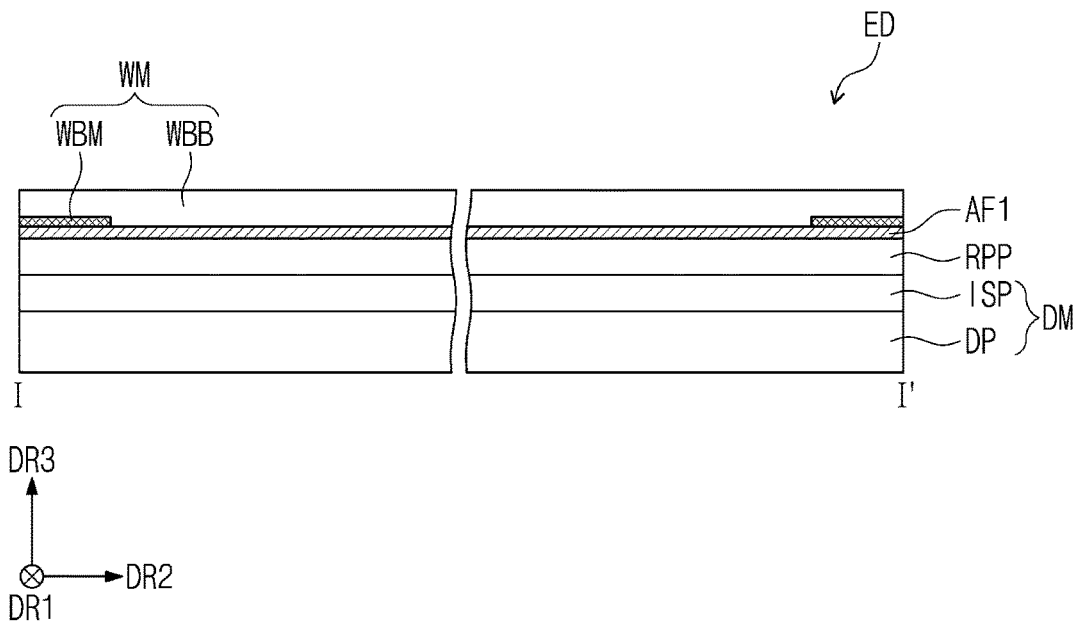
FIGS. 2A, 2B, and 2C are cross-sectional views of an electronic device taken along line I-I' of FIG. 1B according to embodiments of the present disclosure.
Figure 2B:
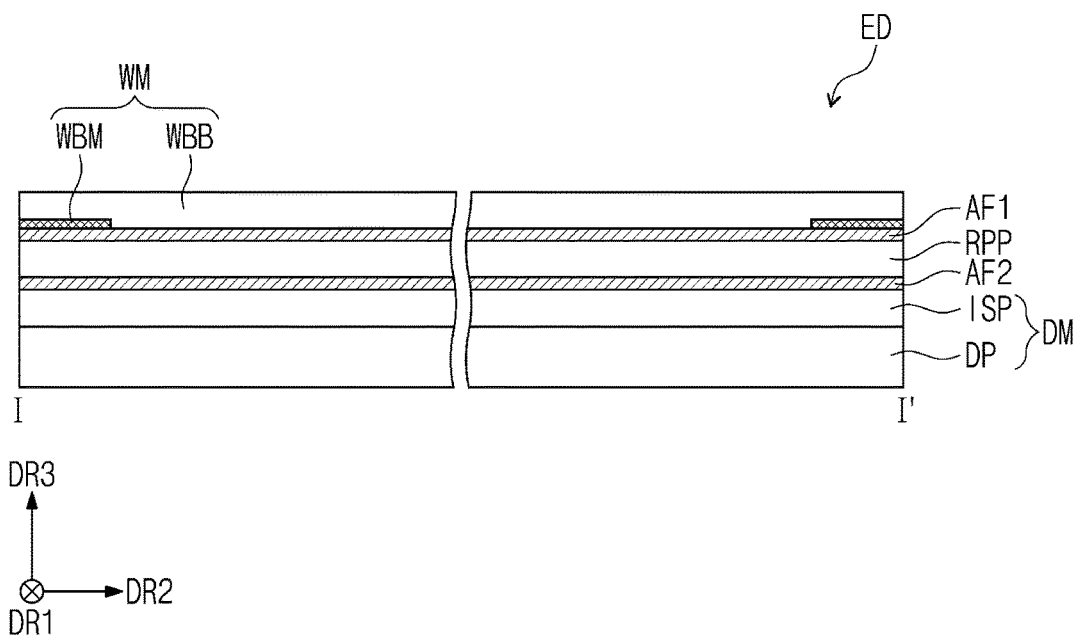
Figure 2C:
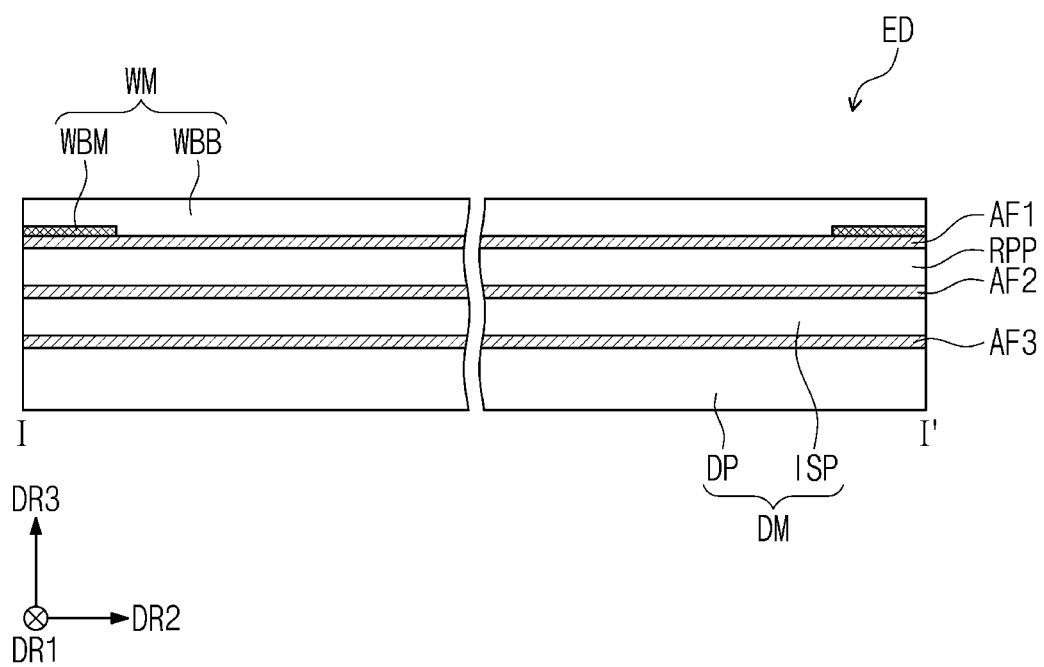

FIGS. 2A to 2C are cross-sectional views of an electronic device according to embodiments of the present disclosure, corresponding to line I-I' of FIG. 1B. FIGS. 2A to 2C illustrate various embodiments according to stacking arrangements of components of the electronic device ED. The above descriptions may be equally applied to components of the electronic device ED illustrated in FIGS. 2A to 2C.

Referring to FIGS. 2A to 2C, the window WM according to an embodiment may include a base substrate WBB and a bezel pattern WBM. The base substrate WBB may include an optically transparent insulating material. In an embodiment, the base substrate WBB may include a glass substrate, a synthetic resin film, or the like. The base substrate WBB may have a single- or multi-layered structure. In an embodiment, at least one functional layer such as an anti-fingerprint layer, an optical layer for controlling a phase, and a hard coating layer may be further disposed on the base substrate WBB.

The bezel pattern WBM may be a color layer formed on one surface of the base substrate WBB. A region where the bezel pattern WBM is disposed may substantially correspond to the bezel region BZA of the window WM. Of the base substrate WBB, a region that non-overlaps the bezel pattern WBM may correspond to the transmission region TA of the window WM.

The bezel pattern WBM may include a material having a predetermined color. For example, the bezel pattern WBM may include a colored organic layer. The bezel pattern WBM may have a single- or multi-layered structure. The multi-layered bezel pattern WBM may include a chromatic color layer and an achromatic (particularly, black) light blocking layer. In an embodiment, the bezel pattern WBM may be formed through deposition, printing, or coating.

The window WM may be bonded onto the anti-reflection member RPP through a first adhesive layer AF1. However, embodiments of the present disclosure are not necessarily limited thereto, and the window WM may be formed on an upper surface of the anti-reflection member RPP through a continuous process.

Referring to FIG. 2A, the input sensing member ISP may be directly disposed on the display panel DP (e.g., in the third direction DR3). In the present description, being formed through a continuous process without a separate adhesive layer or an adhesive member may be expressed as "directly disposed". For example, the expression "the input sensing member ISP is directly disposed on the display panel DP" indicates that after the display panel DP is formed, the input sensing member ISP is formed on a base surface provided by the display panel DP through a continuous process without a separate adhesive layer.

Referring to FIG. 2A, the anti-reflection member RPP may be directly disposed on the display module DM (e.g., in the third direction DR3). For example, in an embodiment, the anti-reflection member RPP may be formed on the upper surface of the input sensing member ISP through a continuous process. For example, the anti-reflection member RPP may be formed by applying (e.g., printing) and patterning a composition of a color filter on a base surface provided by the input sensing member ISP.

However, embodiments of the present disclosure are not necessarily limited thereto, and referring to FIG. 2B, the anti-reflection member RPP may be bonded onto the display module DM through a second adhesive layer AF2. After the forming of the anti-reflection member RPP through a separate process, the anti-reflection member RPP may be bonded onto the upper surface of the input sensing member ISP through the second adhesive layer AF2. For example, the anti-reflection member RPP may be provided in the form of a film, and may be bonded onto the input sensing member ISP through the second adhesive layer AF2.

Referring to FIG. 2C, a third adhesive layer AF3 may be disposed between the input sensing member ISP and the display panel DP (e.g., in the third direction DR3). After being manufactured through a separate process from the display panel DP, the input sensing unit ISP may be bonded onto the upper surface of the display panel DP through the third adhesive layer AF3.

The first to third adhesive layers AF1, AF2, and AF3 may each include a transparent adhesive such as an optically clear adhesive film (OCA), an optically clear resin (OCR), or a pressure sensitive adhesive film (PSA). However, the types of adhesives included in the first to third adhesive layers AF1, AF2 and AF3 are not necessarily limited to the above examples.

The stacking order of the components included in the electronic device ED is not necessarily limited to the embodiments illustrated in FIGS. 2A to 2C. For example, in an embodiment, the anti-reflection member RPP may be disposed between the display panel DP and the input sensing member ISP. The anti-reflection member RPP may be bonded onto the display panel DP through an adhesive layer or may be directly disposed on the display panel DP through a continuous process, and then, the input sensing member ISP may be disposed on the upper surface of the anti-reflection member RPP.

Figure 3:
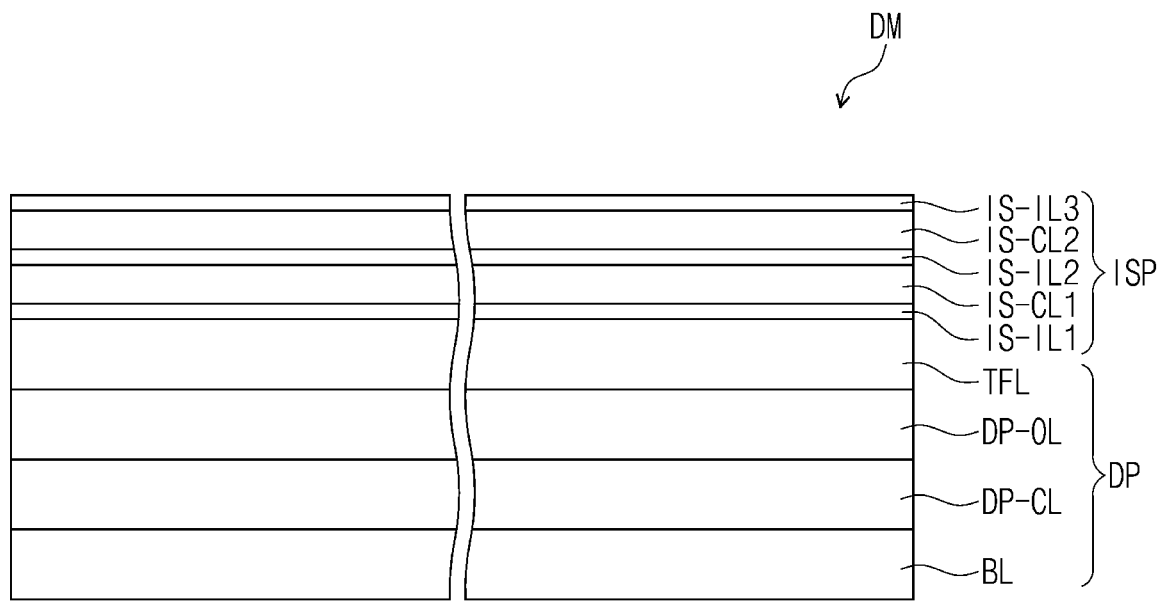
FIG. 3 is a cross-sectional view of a display module according to an embodiment of the present disclosure.
Figure 3:
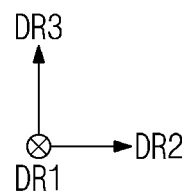

FIG. 3 is a cross-sectional view of a display module according to an embodiment. The display module DM may include the display panel DP and the input sensing member ISP, and the above descriptions may be equally applied to respective components.

Referring to FIG. 3, the display panel DP may include a base layer BL, a circuit element layer DP-CL, a display element layer DP-OL, and an encapsulation layer TFL.

In an embodiment, the base layer BL may include a glass substrate, a metal substrate, a polymer substrate, or an organic/inorganic composite material substrate. The base layer BL may provide a base surface on which the circuit element layer DP-CL is disposed.

The circuit element layer DP-CL may be disposed on the base layer BL (e.g., in the third direction DR3). The circuit element layer DP-CL may include at least one insulating film and a circuit element. For example, the circuit element layer DP-CL may include a driving circuit, signal lines, and signal pads which will be described later.

The display element layer DP-OL may be disposed on the circuit element layer DP-CL (e.g., in the third direction DR3). The display element layer DP-OL may include a plurality of light emitting elements disposed to overlap the active region AA (see FIG. 1B) described above. The display element layer DP-OL may include an organic film such as a pixel defining film.

The encapsulation layer TFL may include a plurality of thin films. Some thin films may be disposed to increase optical efficiency of light emitting elements, and some thin films may be disposed to protect light emitting elements. For example, in an embodiment, the encapsulation layer TFL may include at least one organic layer and at least one inorganic layer.

The input sensing member ISP may include a first insulating layer IS-IL1, a first conductive layer IS-CL1, a second insulating layer IS-IL2, a second conductive layer IS-CL2, and a third insulating layer IS-IL3 (e.g., consecutively stacked in the third direction DR3). The first insulating layer IS-IL1 of the input sensing member ISP may be directly disposed on the encapsulation layer TFL. However, embodiments of the present disclosure are not necessarily limited thereto. For example, in an embodiment, the first insulating layer IS-IL1 of the input sensing member ISP may be omitted.

The first conductive layer IS-CL1 and the second conductive layer IS-CL2 may each have a single-layered structure or a multi-layered structure. The multi-layered conductive layer may include at least two or more layers of transparent conductive layers and metal layers. Alternatively, the multi-layered conductive layer may include metal layers having different metals.

In an embodiment, the first conductive layer IS-CL1 and the second conductive layer IS-CL2 are transparent conductive layers, and may include at least one compound selected from indium tin oxide (ITO), indium zinc oxide (IZO), zinc oxide (ZnO), and indium tin zinc oxide (ITZO), PEDOT, metal nanowires, and graphene. The first conductive layer IS-CL1 and the second conductive layer IS-CL2 are metal layers, and may include molybdenum, silver, titanium, copper, aluminum, and alloys thereof. For example, the first conductive layer IS-CL1 and the second conductive layer IS-CL2 may each have a three-layered structure of titanium/aluminum/titanium. A metal having relatively higher durability and lower reflectivity may be applied to an outer layer of a conductive layer, and a metal having higher electrical conductivity may be applied to an inner layer of the conductive layer.

The first conductive layer IS-CL1 and the second conductive layer IS-CL2 may each include sensing patterns. For example, the sensing patterns may include sensing electrodes and signal lines connected thereto. This will be described in detail later.

The first insulating layer IS-IL1, the second insulating layer IS-IL2, and the third insulating layer IS-IL3 may each include an inorganic film or an organic film. In an embodiment, the first insulating layer IS-IL1 and the second insulating layer IS-IL2 may each include an inorganic film, and the third insulating film IS-IL3 may include an organic film. However, embodiments of the present disclosure are not necessarily limited thereto.

In an embodiment, the inorganic film may include at least one compound selected from aluminum oxide, titanium oxide, silicon oxide, silicon oxynitride, zirconium oxide, and hafnium oxide. However, materials of the inorganic film are not necessarily limited thereto.

In an embodiment, the organic film may include at least one material selected from an acrylic-based resin, a methacrylate-based resin, a polyisoprene-based resin, a vinyl-based resin, an epoxy-based resin, a urethane-based resin, a cellulose-based resin, a siloxane-based resin, a polyamide-based resin, a perylene-based resin, and a polyimide-based resin. However, materials of the organic film are not necessarily limited thereto.

The second insulating layer IS-4L2 may cover the active region AA of the input sensing member ISP. The second insulating layer IS-IL2 may include a plurality of insulating patterns. The plurality of insulating patterns may be patterns for insulating first sensing electrodes and second sensing electrodes, which will be described later, from each other.

Figure 4:
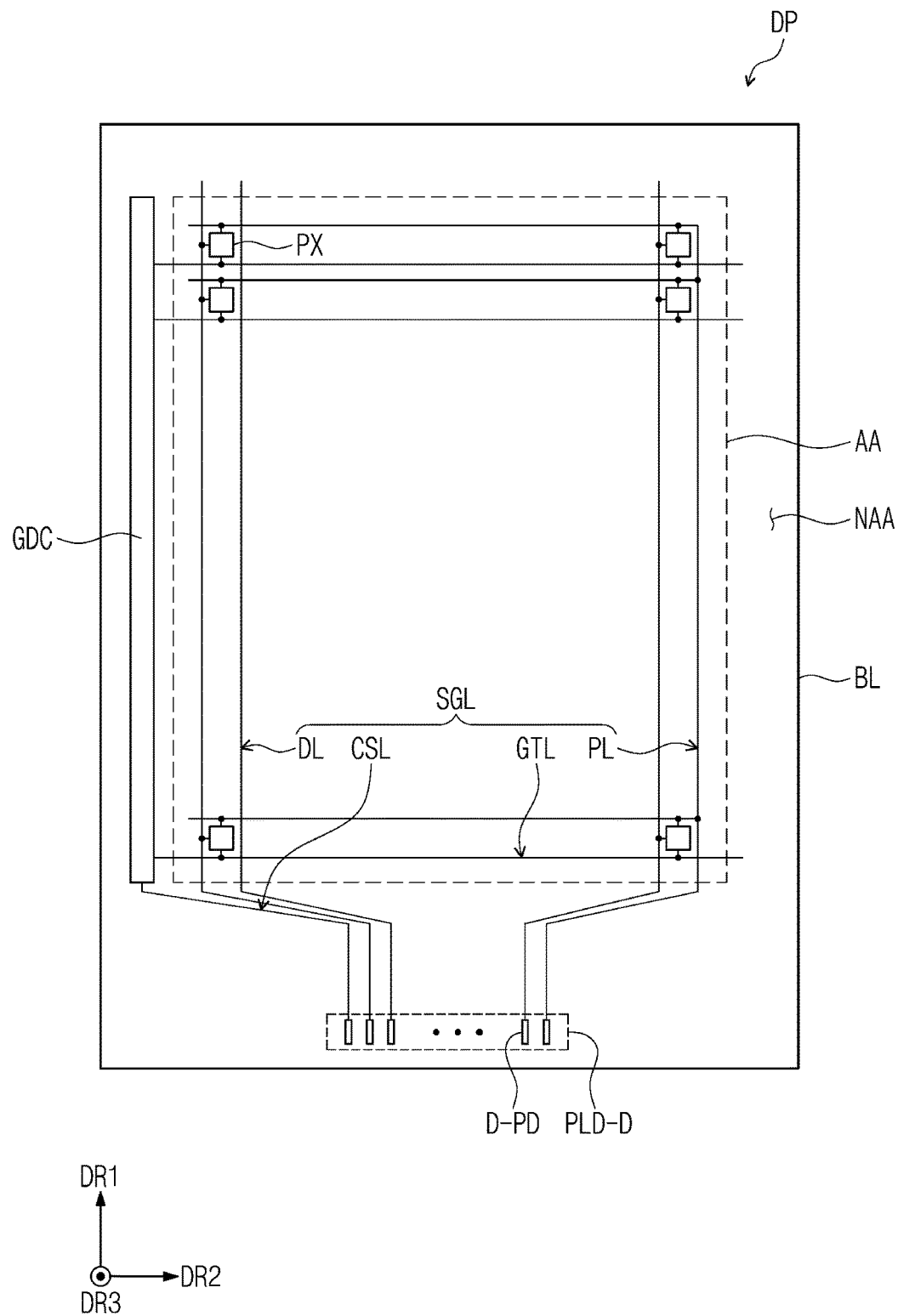
FIG. 4 is a plan view of a display panel according to an embodiment of the present disclosure.
Figure 5:
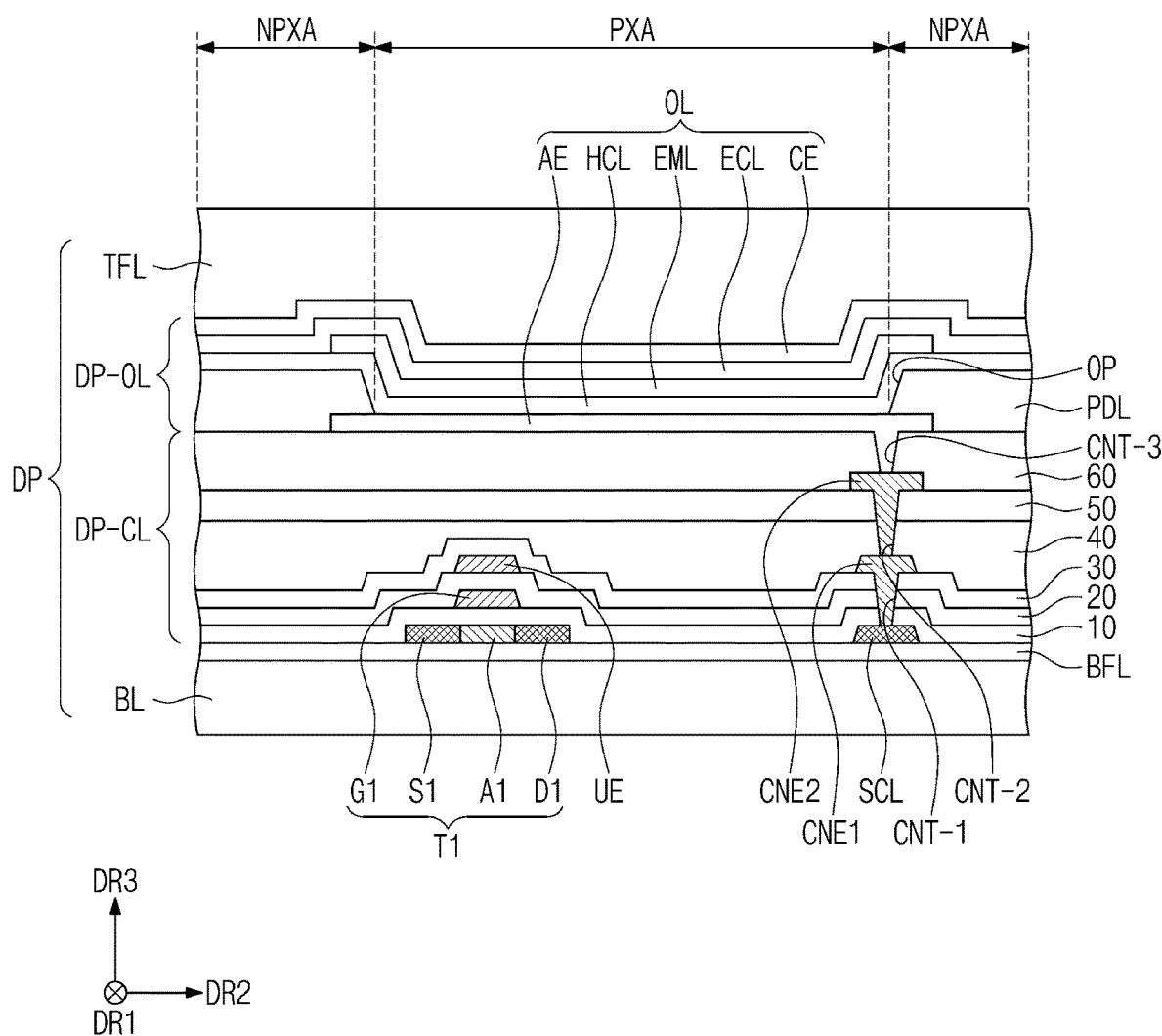
FIG. 5 is a cross-sectional view of a display panel according to an embodiment of the present disclosure.

FIG. 4 is a plan view of a display panel according to an embodiment. FIG. 5 is a cross-sectional view of a display panel according to an embodiment.

Referring to FIG. 4, the display panel DP may include the base layer BL divided into the active region AA and the peripheral region NAA described above. The display panel DP may include pixels PX disposed in the active region AA, and signal lines SGL electrically connected to the pixels PX. The display panel DP may include a driving circuit GDC and a pad region PLD-D, which are disposed in the peripheral region NAA. In the present description, the active region AA of the display panel DP may be defined as a display region having the pixels PX disposed therein to output images, and the peripheral region NAA may be defined as a non-display region in which images are not displayed.

The pixels PX may each include a pixel driving circuit including a light emitting element which will be described later and a plurality of transistors (e.g., a switching transistor, a driving transistor, and the like.) connected thereto. The pixels PX may emit light in response to electrical signals applied to the pixels PX.

The signal lines SGL may include gate lines GTL, data lines DL, a power line PL, and a control signal line CSL. The gate lines GTL may each be connected to a corresponding pixel PX among the pixels PX, and the data lines DL may each be connected to a corresponding pixel PX among the pixels PX. The power line PL may be connected to the pixels PX to provide a voltage. The control signal line CSL may be connected to the driving circuit GDC to provide control signals to the driving circuit GDC.

The driving circuit GDC may include a gate driving circuit. The gate driving circuit may generate gate signals and sequentially output the gate signals to the gate lines GTL. The gate driving circuit may further output another control signal to the driving circuit of the pixels PX.

In an embodiment, the driving circuit GDC and the driving circuit of the pixels PX may include a plurality of thin film transistors formed through, for example, a low temperature polycrystalline silicon (LTPS) process or a low temperature polycrystalline oxide (LTPO) process. However, processes of the thin film transistors are not necessarily limited to the above examples.

The pad region PLD-D may be a portion to which the flexible circuit board FCB of FIG. 1B is connected. In an embodiment, the pad region PLD-D may include pixel pads D-PD arranged in one direction. The pixel pads D-PD may be pads for electrically connecting the flexible circuit board FCB to the display panel DP. However, embodiments of the present disclosure are not necessarily limited thereto, and the pad region PLD-D may further include input pads connecting the input sensing member ISP with the flexible circuit board FCB.

The pixel pads D-PD may each be connected to a corresponding signal line among the signal lines SGL. The pixel pads D-PD may be electrically connected to corresponding pixels PX through the signal lines SGL. At least one pixel pad among the pixel pads D-PD may be connected to the driving circuit GDC.

In an embodiment, the pixel pads D-PD may be shaped as a single body together with the signal lines SGL. However, embodiments of the present disclosure are not necessarily limited thereto. For example, in an embodiment, the pixel pads D-PD may be disposed on a different layer from the signal lines SGL and may respectively be connected to ends of the signal lines SGL through a contact hole passing through an insulating layer.

Referring to FIG. 5, the display panel DP may include a base layer BL, a circuit element layer DP-CL, a display element layer DP-OL, and an encapsulation layer TFL, and the above descriptions may be equally applied to respective components and a repeated description may be omitted for convenience of explanation.

In an embodiment, the display panel DP may include a plurality of insulating layers, a semiconductor pattern, a conductive pattern, and a signal line. In an embodiment, during the manufacture of the display panel DP, an insulating layer, a semiconductor layer, and a conductive layer may be formed through processes such as coating or vapor deposition, and then the insulating layer, the semiconductor layer, and the conductive layer may be selectively patterned through a photolithography process. Through such processes, a semiconductor pattern, a conductive pattern, a signal line, and the like included in the circuit element layer DP-CL and the display element layer DP-OL may be formed.

The semiconductor pattern may be arranged according to predetermined rules over pixels. The pixels PX (see FIG. 4) may each have an equivalent circuit including a plurality of transistors, at least one capacitor, and a light emitting element, and the equivalent circuit diagram of the pixels may be modified in various forms. FIG. 5 illustrates one transistor T1, a connection signal line SCL, and a light emitting element OL included in the pixels PX (see FIG. 4) as an example.

In an embodiment, the base layer BL may have a multi-layered structure. For example, the base layer BL may have a structure including synthetic resin layers and at least one inorganic layer disposed between the synthetic resin layers. For example, the synthetic resin layer of the base layer BL may include at least one among material selected from an acrylic resin, a methacrylate-based resin, polyisoprene, a vinyl-based resin, an epoxy-based resin, a urethane-based resin, a cellulose-based resin, a siloxane-based resin, a polyamide-based resin, a perylene-based resin, and a polyimide-based resin. However, embodiments of the present disclosure are not necessarily limited thereto.

At least one inorganic layer may be disposed on an upper surface of the base layer BL. The inorganic layer may form a barrier layer and/or a buffer layer. FIG. 5 illustrates the buffer layer BFL disposed on the base layer BL as an example. The buffer layer BFL may increase the bonding force between the base layer BL and the circuit element layer DP-CL. In an embodiment, the buffer layer BFL may include at least one compound selected from aluminum oxide, titanium oxide, silicon oxide, silicon nitride, silicon oxynitride, zirconium oxide, and hafnium oxide.

The semiconductor pattern of the circuit element layer DP-CL may be disposed on the buffer layer BFL (e.g., directly thereon in the third direction DR3). FIG. 5 illustrates a portion of the semiconductor pattern, and the semiconductor pattern may be arranged according to predetermined rules when viewed in a plane. The semiconductor pattern may include polysilicon. However, embodiments of the present disclosure are not necessarily limited thereto, and the semiconductor pattern may include amorphous silicon or metal oxide.

The semiconductor pattern may have different electrical properties according to a doping level. In an embodiment, the semiconductor pattern may include a first region having high conductivity and a second region having low conductivity. The first region may be doped with an N-type dopant or a P-type dopant. A P-type transistor may include a doped region which is doped with the P-type dopant, and an N-type transistor may include a doped region doped with the N-type dopant. The second region may be a non-doped region or may be doped in a lower concentration than the first region.

In an embodiment, the first region has greater conductivity than the second region, and may substantially serve as an electrode or a signal line. The second region may substantially correspond to an active region (e.g., a channel region) of the transistor. For example, a portion of the semiconductor pattern may be an active region of the transistor, and another portion may be a source region or a drain region of the transistor.

In an embodiment, the circuit element layer DP-CL may include a transistor T1, a connection signal line SCL, and a plurality of insulating films. A source region S1, an active region A1, and a drain region D1 of the transistor T1 may be formed from the semiconductor pattern. The connection signal line SCL may be formed from the semiconductor pattern, and may be disposed on the same layer as the source region S1, the active region A1, and the drain region D1 of the transistor T1. The connection signal line SCL may be electrically connected to the drain region D1 of the transistor T1 when viewed in a plane.

The plurality of insulating films may be disposed on the buffer layer BEL. FIG. 5 illustrates first to sixth insulating films 10 to 60 as an example of the plurality of insulating films. However, embodiment of the present disclosure are not necessarily limited thereto and the number of the plurality of insulating films may vary. The first to sixth insulating films 10 to 60 may be inorganic and/or organic films. For example, the inorganic film may include at least one compound selected from aluminum oxide, titanium oxide, silicon oxide, silicon nitride, silicon oxynitride, zirconium oxide, and hafnium oxide.

The first insulating film 10 may cover the semiconductor pattern of the transistor T1. A gate electrode G1 of the transistor T1 may be disposed on the first insulating film 10. The gate electrode G1 may be a portion of the conductive pattern. The gate electrode G1 may overlap the active region A1. The gate electrode G1 may serve as a mask in the process of doping the semiconductor pattern.

The second insulating film 20 may be disposed on the first insulating film 10 (e.g., directly thereon in the third direction DR3) and may cover the gate electrode G1. An upper electrode UE may be disposed on the second insulating film 20 (e.g., directly thereon in the third direction DR3). The upper electrode UE may overlap the gate electrode G1.

The third insulating film 30 may be disposed on the second insulating film 20 (e.g., directly thereon in the third direction DR3) and may cover the upper electrode UE. A first connection electrode CNE1 may be disposed on the third insulating film 30 (e.g., directly thereon in the third direction DR3). The first connection electrode CNE1 may be connected to the connection signal line SCL through a contact hole CNT-1 penetrating the first to third insulating films 10, 20, and 30.

The fourth insulating film 40 may be disposed on the third insulating film 30 (e.g., directly thereon in the third direction DR3). The fifth insulating film 50 may be disposed on the fourth insulating film 40 (e.g., directly thereon in the third direction DR3). In an embodiment, the fourth insulating film 40 and the fifth insulating film 50 may include an organic film. A second connection electrode CNE2 may be disposed on the fifth insulating film 50 (e.g., directly thereon in the third direction DR3). The second connection electrode CNE2 may be connected to the first connection electrode CNE1 through a contact hole CNT-2 penetrating the fourth insulating film 40 and the fifth insulating film 50.

The sixth insulating film 60 may be disposed on the fifth insulating film 50 (e.g., directly thereon in the third direction DR3) and may cover the second connection electrode CNE2. In an embodiment, the sixth insulating film 60 may include an organic film.

The display element layer DP-OL may be disposed on the circuit element layer DP-CL (e.g., directly thereon in the third direction DR3). The display element layer DP-OL may include a plurality of light emitting elements OL and a pixel defining film PDL. FIG. 5 illustrates a cross-section corresponding to one light emitting element OL among the plurality of light emitting elements OL. In an embodiment, the light emitting element OL may include a first electrode AE, a hole control layer HCL, an emission layer EML, an electron control layer ECL, and a second electrode CE.

The display element layer DP-OL may include a light emitting region PXA corresponding to the light emitting element OL and a non-light emitting region NPXA surrounding the light emitting region PXA (e.g., in the first and/or second directions DR1, DR2). In an embodiment, the light emitting element OL of the display element layer DP-OL may be provided in plurality, and accordingly, the display element layer DP-OL may include a plurality of light emitting regions PXA and a non-light emitting region NPXA surrounding the plurality of light emitting regions PXA.

The first electrode AE may be disposed on the sixth insulating film 60 (e.g., directly thereon in the third direction DR3). The first electrode AE may be connected to the second connection electrode CNE2 through a contact hole CNT-3 penetrating the sixth insulating film 60.

The pixel defining film PDL may be disposed on the sixth insulating film 60 (e.g., directly thereon in the third direction DR3). An opening OP exposing a portion of the first electrode AE may be defined in the pixel defining film PDL. The pixel defining film PDL may cover a portion of an upper surface of the first electrode AE. For example, in an embodiment as shown in FIG. 5, the pixel defining film PDL may cover lateral edges of the upper surfaces of the first electrode AE and may expose a central portion of the first electrode.

In an embodiment, a portion of the first electrode AE exposed through the opening OP may correspond to the light emitting region PXA.

In an embodiment, the pixel defining film PDL may include an organic material. The pixel defining film PDL according to an embodiment may have a predetermined color. For example, the pixel defining film PDL may include a base resin and a black pigment and/or a black dye mixed with the base resin. However, embodiments of the pixel defining film PDL are not necessarily limited thereto.

In an embodiment, the hole control layer HCL may be disposed on the first electrode AE and the pixel defining film PDL (e.g., directly thereon in the third direction DR3). The hole control layer HCL may be a common layer provided in common to pixels. The hole control layer HCL may overlap the light emitting region PXA and the non-light emitting region NPXA. The hole control layer HCL may include at least one of a hole transport layer or a hole injection layer.

The emission layer EML may be disposed on the hole control layer HCL (e.g., directly thereon in the third direction DR3). The emission layer EML may be disposed in a region corresponding to the opening OP of the pixel defining film PDL. In an embodiment, the emission layer EML may include an organic light emitting material, an inorganic light emitting material, quantum dots, or quantum rods. In an embodiment, the emission layer EML may be separately formed in each of the pixels. Each of the emission layers EML formed separately may emit light of at least one of red, green, or blue. However, embodiments of the present disclosure are not necessarily limited thereto, and the emission layers EML may be provided in common to the pixels and may emit blue or white light.

The electron control layer ECL may be disposed on the emission layer EML (e.g., directly thereon in the third direction DR3). In an embodiment, the electron control layer ECL may be a common layer provided in common to pixels. The electron control layer ECL may overlap the light emitting region PXA and the non-light emitting region NPXA. The electron control layer ECL may include at least one of an electron transport layer or an electron injection layer.

The second electrode CE may be disposed on the electron control layer ECL (e.g., directly thereon in the third direction DR3). In an embodiment, the second electrode CE may be a common layer provided in common to pixels. The second electrode CE may overlap the light emitting region PXA and the non-light emitting region NPXA. For example, the second electrodes CE of the light emitting elements OL may be shaped as a single body and may be disposed in the form of a single common layer. The second electrode CE may be provided with a common voltage, and may be referred to as a common electrode.

The encapsulation layer TFL may be disposed on the display element layer DP-OL (e.g., directly thereon in the third direction DR3) to seal the display element layer DP-OL. The encapsulation layer TFL may include an inorganic film and an organic film. For example, in an embodiment, the encapsulation layer TFL may include a plurality of inorganic films and an organic film disposed between the plurality of inorganic films. However, the structure of the encapsulation layer TFL is not limited thereto. The inorganic film may protect the light emitting element layer DP-OL from moisture and/or oxygen. The organic film may protect the light emitting element layer DP-OL from foreign substances such as dust particles.

For example, in an embodiment, the inorganic film of the encapsulation layer TFL may include at least one compound selected from aluminum oxide, titanium oxide, silicon oxide, silicon nitride, silicon oxynitride, zirconium oxide, and hafnium oxide. The organic film of the encapsulation layer TFL may include an acrylic resin. However, the materials of the inorganic film and the organic film are not limited to the above examples.

Figure 6:
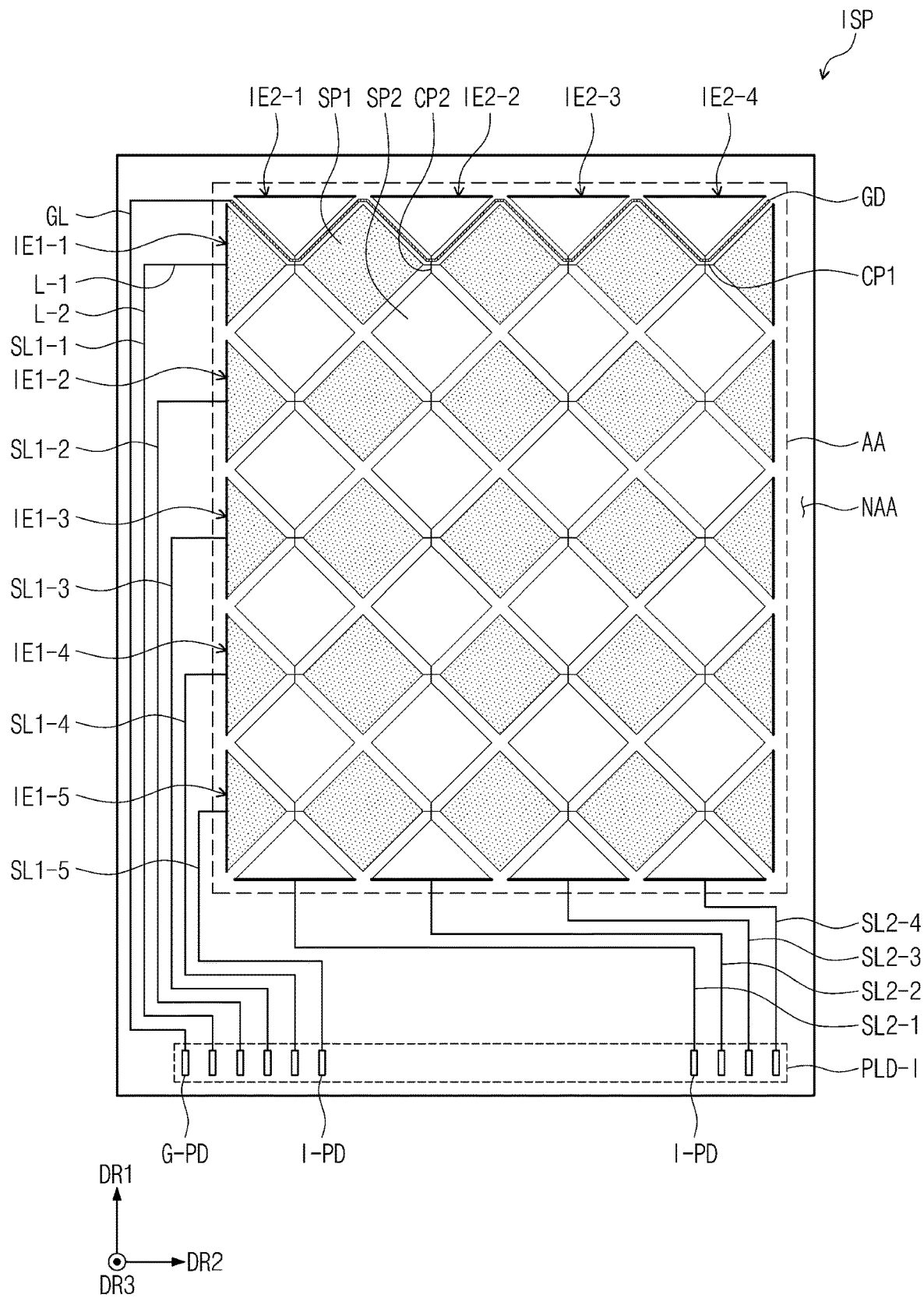
FIG. 6 is a plan view of an input sensing member according to an embodiment of the present disclosure.
Figure 7A:
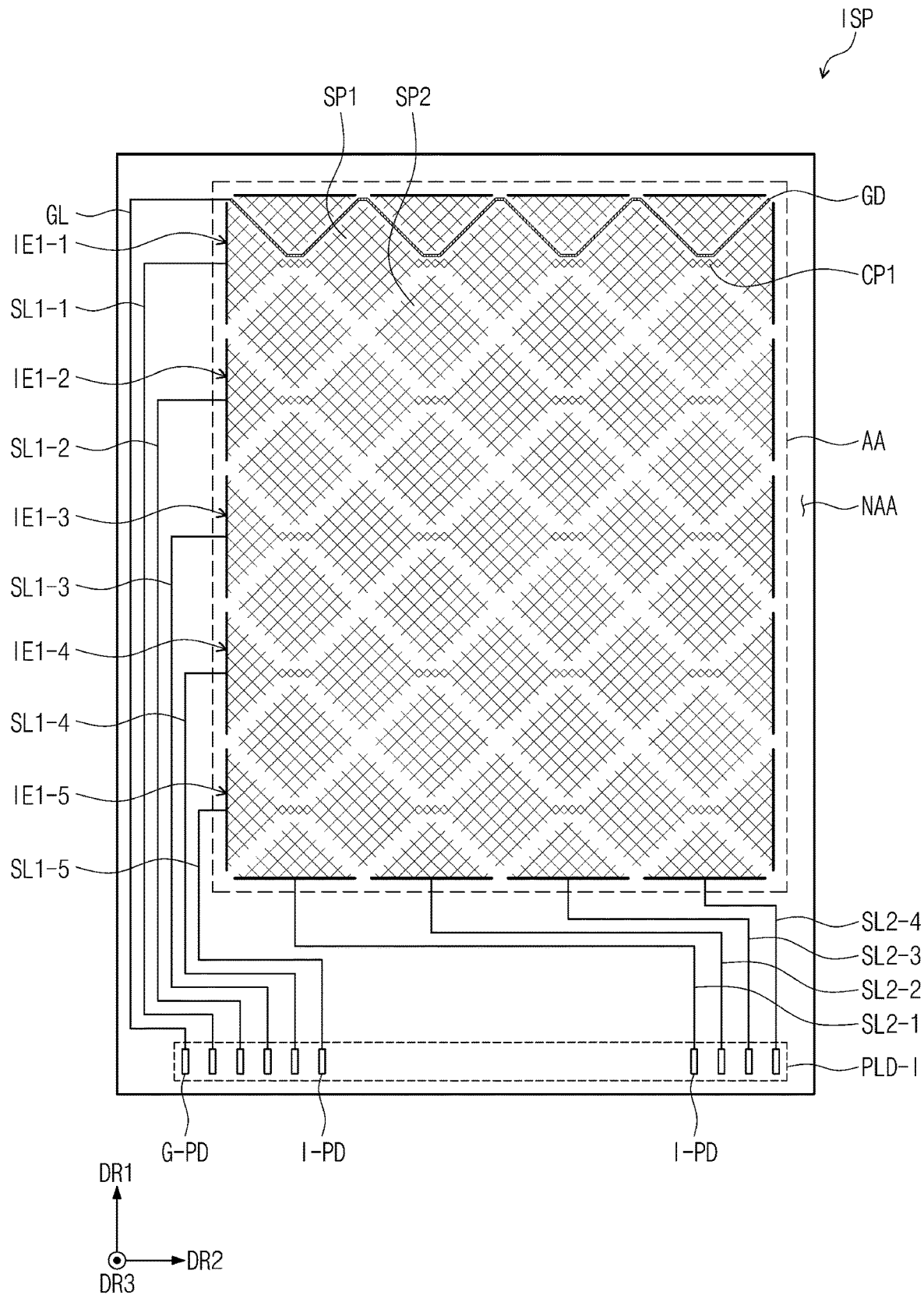
FIGS. 7A and 7B are plan views illustrating some components of an input sensing member according to embodiments of the present disclosure.
Figure 7B:
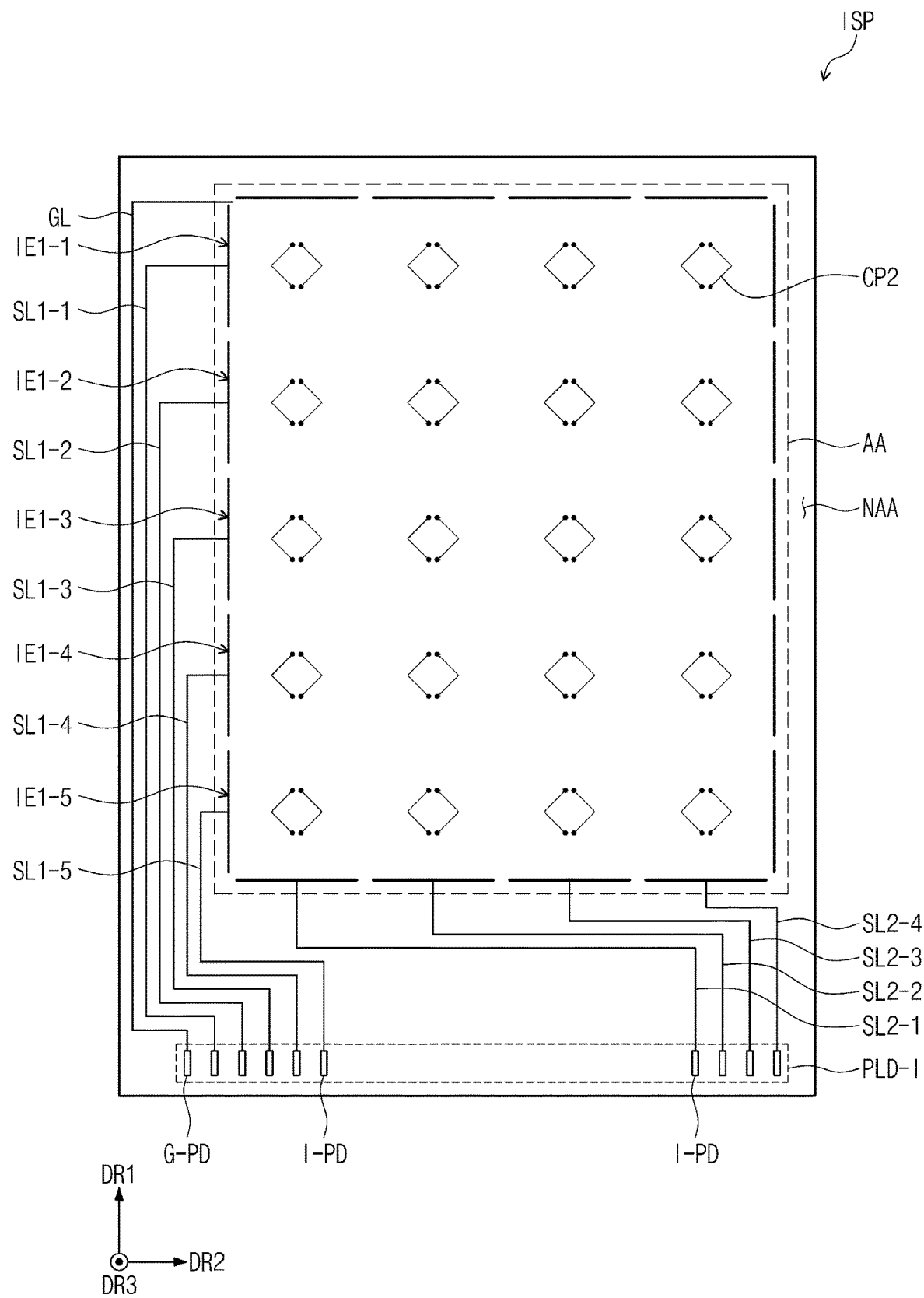

FIG. 6 is a plan view of an input sensing member according to an embodiment. FIGS. 7A and 7B are plan views illustrating some components of the input sensing member illustrated in FIG. 6.

Referring to FIG. 6, the input sensing member ISP may include a plurality of sensing electrodes and a plurality of signal lines. The input sensing member ISP according to an embodiment may include first sensing electrodes IE1-1 to IE1-5 and second sensing electrodes IE2-1 to IE2-4. The input sensing member ISP may include first signal lines SL1-1 to SL1-5 connected to the first sensing electrodes IE1-1 to IE1-5, respectively, and second signal lines SL2-1 to SL2-4 connected to the second sensing electrodes IE2-1 to IE2-4, respectively.

The input sensing member ISP may include an active region AA and a peripheral region NAA, which may correspond to the active region AA and the peripheral region NAA of the display module DM described above. In the present description, the active region AA of the input sensing member ISP may be defined as a sensing region in which sensing electrodes are disposed to detect external inputs. The first sensing electrodes IE1-1 to IE1-5 and the second sensing electrodes IE2-1 to IE2-4 may be disposed in the active region AA, and the first signal lines SL1-1 to SL1-5 and the second signal lines SL2-1 to SL2-4 may be disposed in the peripheral region NAA.

The input sensing member ISP may include a guard pad G-PD and input pads I-PD. The guard pad G-PD and the input pads I-PD may be disposed in an input pad region PLD-1 defined adjacent to one end of the input sensing member ISP in the peripheral region NAA. For example, in an embodiment shown in FIG. 6, the guard pad G-PD and the input pads I-PD are disposed in a lower region (e.g., in the first direction DR1) in the input sensing member ISP. However, embodiments of the present disclosure are not necessarily limited thereto. The guard pad G-PD and the input pads I-PD may be arranged along an extension direction of one end of the input sensing member IS. For example, as illustrated in an embodiment as shown in FIG. 6, the guard pad G-PD and the input pads I-PD may be arranged along the second direction DR2. The guard pad G-PD and the input pads I-PD may be portions to which a circuit board is connected. In an embodiment, the guard pad G-PD and the input pads I-PD may be formed through the same process and disposed on the same layer. However, embodiments of the present disclosure are not necessarily limited thereto.

The input pads I-PD may be shaped as a single body together with the signal lines of the input sensing member ISP. However, embodiments of the present disclosure are not necessarily limited thereto, and the input pads I-PD may be disposed on the same layer as the pixel pads D-PD (see FIG. 4) described above, and may be connected to ends of the signal lines of the input sensing member ISP through contact holes penetrating an insulating layer.

In an embodiment, the first sensing electrodes IE1-1 to IE1-5 and the second sensing electrodes IE2-1 to IE2-4, the first signal lines SL1-1 to SL1-5, and the second signal lines SL2-1 to SL2-4 may be disposed on an upper surface of the first insulating layer IS-IL1 illustrated in FIG. 3. However, embodiments of the present disclosure are not limited thereto. For example, in an embodiment, the first insulating layer IS-IL1 may be omitted, and the first sensing electrodes IE1-1 to IE1-5, and the second sensing electrodes IE2-1 to IE2-4, the first signal lines SL1-1 to SL1-5, and the second signal lines SL2-1 to SL2-4 may be disposed on a base surface provided by the display panel DP (e.g., disposed directly thereon in the third direction DR3).

In an embodiment, the input sensing member ISP may be a capacitance-type touch sensor. For example, the input sensing member ISP may acquire information about external inputs through mutual capacitance variation between the first sensing electrodes IE1-1 to IE1-5 and the second sensing electrodes IE2-4 to IE2-4.

Any one of the first sensing electrodes IE1-1 to IE1-5 and the second sensing electrodes IE2-4 to IE2-4 may receive a driving signal, and the other one may output capacitance variation between the first sensing electrodes IE1-1 to IE1-5 and the second sensing electrodes IE2-1 to IE2-4 as a sensing signal.

In an embodiment, the first sensing electrodes IE1-1 to IE1-5 and the second sensing electrodes IE2-1 to IE2-4 may be alternately arranged. The first sensing electrodes IE1-1 to IE1-5 may be arranged in n rows that extend along the first direction DR1. The second sensing electrodes IE2-4 to IE2-4 may be arranged in m columns that extend along the second direction DR2. In an embodiment, n and m may each be a natural number of 2 or more (e.g., greater than or equal to 2). FIG. 6 illustrates first sensing electrodes IE1-1 to IE1-5 arranged in five rows and second sensing electrodes IE2-4 to IE2-4 arranged in four columns as an example. However, embodiments of the present disclosure are not necessarily limited thereto and the number of n rows and m columns may vary.

In an embodiment, the first sensing electrodes IE1-1 to IE1-5 may each extend in the second direction DR2 in which the second sensing electrodes IE2-1 to IE2-4 are arranged. The second sensing electrodes IE2-1 to IE2-4 may each extend in the first direction DR1 in which the first sensing electrodes IE1-1 to IE1-5 are arranged. The first sensing electrodes IE1-1 to IE1-5 and the second sensing electrodes IE2-1 to IE2-4 may be electrically insulated from each other.

The number, length, shape, or area of the first sensing electrodes IE1-1 to IE1-5 and the second sensing electrodes IE2-1 to IE2-4 are not limited to those illustrated in FIG. 6, and may vary depending on the arrangement and area of the sensing electrodes and the area of the active region AA.

The first signal lines SL1-1 to SL1-5 may be respectively connected to the first sensing electrodes IE-1 to IE1-5 arranged in n rows. For example, in an embodiment, first ends of the first signal lines SL1-1 to SL1-5 may be respectively connected to first ends of the first sensing electrodes IE1-1 to IE1-5. Each of second ends of the first signal lines SL1-1 to SL1-5 that are opposite to the first ends may be connected to a corresponding input pad I-PD among the input pads I-PD.

FIG. 6 illustrates an embodiment in which the first signal lines SL1-1 to SL1-5 are respectively connected to left ends (e.g., in the second direction DR2) of the first sensing electrodes IE1-1 to IE1-5. However, embodiments of the present disclosure are not limited thereto, and some of the first signal lines SL1-1 to SL1-5 may be connected to right ends (e.g., in the second direction DR2) of the first sensing electrodes IE1-1 to IE1-5.

The second signal lines SL2-1 to SL2-4 may respectively be connected to the second sensing electrodes IE2-1 to IE2-4 arranged in m columns. For example, in an embodiment, first ends of the second signal lines SL2-1 to SL2-4 may be connected to first ends of the second sensing electrodes IE2-1 to IE2-4 adjacent to the sensing pad region PLD-1, respectively. FIG. 6 illustrates an embodiment in which the second signal lines SL2-1 to SL2-4 are respectively connected to lower ends (e.g., in the first direction DR1) of the second sensing electrodes IE2-1 to IE2-4. Each of the second ends of the second signal lines SL2-1 to SL2-4 may be connected to a corresponding input pad I-PD among the input pads I-PD.

The first sensing electrodes IE1-1 to IE1-5 may each include first sensor portions SP1 and first connection portions CP1 disposed in the active region AA. In one first sensing electrode, the first sensor portions SP1 may be arranged along the second direction DR2. The first connection portions CP1 may each connect the first sensor portions SP1 positioned adjacent to each other in the second direction DR2.

The second sensing electrodes IE2-1 to IE2-4 may each include second sensor portions SP2 and second connection portions CP2 disposed in the active region AA. In one second sensing electrode, the second sensor portions SP2 may be arranged along the first direction DR1. The second connection portions CP2 may each connect the second sensor portions SP2 positioned adjacent to each other in the first direction DR1.

The first and second connection portions CP1 and CP2 may each cross each other when viewed in a plane (e.g., in a plane defined in the first and second directions DR1, DR2). The first and second connection portions CP1 and CP2 may be disposed on different layers to overlap each other (e.g., in the third direction DR3). However, embodiments of the present disclosure are not necessarily limited thereto. For example, in an embodiment the first connection portions CP1 or the second connection portions CP2 may be deformed into a curved line of "<" and/or a curved line of ">". For example, the second connection portions CP2 may each be shaped as a curved line, and the second connection portions CP2 having the curved line shape may overlap the first sensor portions SP1 when viewed in a plane.

FIG. 6 illustrates shapes of the first sensing electrodes IE1-1 to IE1-5 and the second sensing electrodes IE2-1 to IE2-4 according to an embodiment, and shapes of sensing electrodes are not necessarily limited thereto. The shapes of the sensor portions of the sensing electrodes are not necessarily limited to the diamond shape illustrated in FIG. 6, and may be various polygonal shapes.

The input sensing member ISP according to an embodiment may include a guard electrode GD disposed in the active region AA and a guard line GL disposed in the peripheral region NAA. The guard electrode GD may be electrically connected to the guard line GL.

The guard electrode GD may be disposed adjacent to the periphery of a sensing electrode disposed at an outermost side among the first sensing electrodes IE1-1 to IE1-5 or the second sensing electrodes IE2-1 to IE2-4 in the active region AA. Referring to an embodiment as shown in FIG. 6, the guard electrode GD may be disposed around the outermost-positioned first sensing electrode IE1-1 among the first sensing electrodes IE1-1 to IE1-5. For example, the guard electrode GD may be disposed around the first sensing electrode IE1-1 which is an outermost positioned first sensing electrodes IE1-1 to IE1-5 in the first direction DR1. However, embodiments of the present disclosure are not necessarily limited thereto.

Among the first sensing electrodes IE1-1 to IE1-5 arranged in n rows, a row disposed farthest away from the input pads I-PD in the first direction DR1 may be defined as a first row, and a row closest to the input pads I-PD may be defined as an n-th row (e.g., a fifth row in FIG. 6). In an embodiment, the guard electrode GD may be disposed around the first sensing electrode IE1-1 in the first row disposed farthest away from the input pads I-PD among the first sensing electrodes IE1-1 to IE1-5.

The guard electrode GD disposed adjacent to the first sensing electrode IE1-1 in the first row (a "first row first sensing electrode") may generally extend along an extension direction of the first sensing electrode IE1-1 (e.g., the second direction DR2 in an embodiment of FIG. 6). The guard electrode GD may be disposed at the outermost side of the first sensing electrode IE1-1 in the first row in the first direction DR1.

For example, the guard electrode GD may not be disposed between the first sensing electrode IE1-1 in the first row and the first sensing electrode IE1-2 in the second row, and may be spaced apart from the first sensing electrode IE1-2 in the second row with the first sensing electrode IE1-1 in the first row therebetween. In an embodiment in which the guard electrode GD is disposed outside the first sensing electrode IE1-1 in the first row, the guard electrode GD may not affect the detection of mutual capacitance variation of a main sensing region provided at the center of the active region AA, and may also increase the touch sensitivity of the sensing electrode disposed in an outer region.

The guard electrode GD may be disposed along the outermost boundary of the first sensing electrode IE1-1 in the first row. The shape of the guard electrode GD may correspond to the shape of the outermost boundary of the first sensing electrode IE1-1. FIG. 6 illustrates a guard electrode GD having a zigzag shape along the boundary of the first sensing electrode IE1-1 in the first row as an example. However, embodiments of the present disclosure are not necessarily limited thereto. For example, the shape of the guard electrode GD may vary, such as based on the shape of the electrode. The guard electrode GD may be disposed along a boundary between the first sensor portions SP1 and the first connection portions CP1 of the first sensing electrode IE1-1 in the first row. For example, the guard electrode GD may be disposed along a boundary of the first sensor portions SP1 and the first connection portions CP1 of the first sensing electrode IE1-1 in the first row.

In an embodiment, some of the second sensor portions SP2 of the second sensing electrodes IE2-1 to IE2-4 may be disposed above (e.g., in the third direction DR3) the first sensing electrode IE1-1 in the first row when viewed in a plane. In an embodiment, the guard electrode GD may be disposed between a boundary of the first sensor portions SP1 and the first connection portions CP1 of the first sensing electrode IE1-1 in the first row and a boundary of the second sensor portions SP2 disposed at the uppermost side when viewed in a plane. However, embodiments of the present disclosure are not necessarily limited thereto. For example, the second sensor portions SP2 of the second sensing electrodes IE2-1 to IE2-4 disposed at the uppermost side among the second sensor portions SP2 may be disposed below the first sensing electrode IE1-1 in the first row when viewed in a plane.

The guard electrode GD may be electrically insulated from the first sensing electrodes IE1-1 to IE1-5 and the second sensing electrodes IE2-1 to IE2-4. For example, the guard electrode GD may be disposed to be spaced apart from the first sensor portions SP1 and the first connection portions CP1 of the first sensing electrode IE1-1 in the first row when viewed in a plane. In addition, the guard electrode GD may be disposed apart from the second sensor portions SP2 of the second sensing electrodes IE2-1 to IE2-4 arranged at the uppermost side when viewed in a plane and arranged along the second direction DR2.

The guard electrode GD may include a conductive material. In an embodiment, the guard electrode GD may include the same material as that of the first sensing electrodes IE1-1 to IE1-5. In an embodiment, during the manufacture of the first sensing electrodes IE1-1 to IE1-5, the guard electrode GD may be formed together with the first sensing electrodes IE1-1 to IE1-5. Therefore, according to an embodiment of the present disclosure, the guard electrode GD may be manufactured without adding a complicated process or a huge process cost.

A first of the guard line GL may be connected to a first end of the guard electrode GD. The second end of the guard line GL that is opposite to the first end may be connected to the guard pad G-PD.

The guard line GL may be connected to the guard electrode GD in the same direction as the connection direction of the first signal line SL1-1 (hereinafter referred to as the first signal line SL1-1 of the first row or a "first row first signal line") connected to the first sensing electrode IE1-1 in the first row. Referring to FIG. 6, the first signal line SL1-1 of the first row may be connected to a left end (e.g., in the second direction DR2) of the first sensing electrode IE1-1, and the guard line GL may also be connected to a left end (e.g., in the second direction DR2) of the guard electrode GD.

The guard line GL may be disposed adjacent to the outermost-positioned first signal line among the first signal lines SL1-1 to SL1-5. Referring to FIG. 6, the first signal line SL1-1 connected to the first sensing electrode IE1-1 in the first row disposed farthest away from the input pads I-PD may be disposed at the outermost side among the first signal lines SL1-1 to SL1-5. For example, each of the first signal lines SL1-1 to SL1-5 may each be connected to the input pads I-PD arranged along the second direction DR2 and may be spaced apart along the second direction DR2 when viewed in a plane, and the first signal line SL1-1 of the first row may be disposed at the outermost side in the second direction DR2.

The first signal line SL1-1 connected to the first sensing electrode IE1-1 in the first row disposed farthest away from the input pad I-PD may be the longest among the first signal lines SL1-1 to SL1-5. The first signal line SL1-5 connected to the first sensing electrode (the first sensing electrode IE1-5 in the fifth row in FIG. 6) in the n-th row disposed closest to the input pads I-PD may be the shortest among the first signal lines SL1-1 to SL1-5.

In an embodiment, the first signal lines SL1-1 to SL1-5 each may include a first line portion L-1 extending in the second direction DR2 from a first side of the corresponding first sensing electrodes IE1-1 to IE1-5, and a second line portion L-2 extending in the first direction DR1 from an end of the first line portion L-1 toward the input pad I-PD. FIG. 6 illustrates the first line portion L-1 and the second line portion L-2 of the first signal line SL1-1 of the first row. The second line portion L-2 of the first signal line SL1-1 electrically connecting the first sensing electrode IE1-1 in the first row spaced farthest away from the input pad I-PD with the input pad I-PD may be the longest (e.g., largest length in the first direction DR1) among second line portions of the second signal lines SL1-1 to SL1-5.

The guard line GL may be disposed at the outside of the first signal line SL1-1 of the first row, which is the longest among the first signal lines SL1-1 to SL1-5 when viewed in a plane. Accordingly, the guard line GL may be disposed closer to the outermost side of the peripheral region NAA than the first signal line SL1-1 of the first row.

The guard line GL may not be disposed between the first signal lines SL1-1 to SL1-5, but may be disposed outside of the first signal lines SL1-1 to SL1-5. For example, as shown in an embodiment of FIG. 6, the guard line GL may include a first portion that extends in the second direction DR2 that is disposed above the first line portion L-1 of the first signal line SL1-1 (e.g., in the first direction DR1) and a portion that extends in the first direction DR1 and is disposed to the left of the first signal line SL1-1 (e.g., in the second direction DR2). Accordingly, the guard line GL may be spaced apart from the first signal line SL1-2 of the second row with the first signal line SL1-1 of the first row therebetween when viewed in a plane.

The first signal line SL1-1 of the first row, which is the longest among the first signal lines SL1-1 to SL1-5 may be relatively vulnerable to coupling by peripheral conductive patterns such as the driving circuit GDC or the signal lines SGL of the display panel DP, and may have parasitic coupling. Accordingly, when the first sensing electrode IE1-1 in the first row receives driving signals from the first signal line SL1-1 of the first row, driving signal levels may increase due to parasitic coupling. In addition, parasitic coupling may occur in the first sensing electrode IE1-1 due to conductive patterns such as the common electrode of the display panel DP disposed in the active region AA.

In an embodiment, the same signal as the driving signal applied to the first signal line SL1-1 of the first row disposed adjacent to the guard line GL may be applied to the guard line GL connected to the guard pad G-PD. The signal applied to the guard line GL may be transmitted to the guard electrode GD connected to the guard line GL.

The guard line GL is disposed along the signal line disposed in the peripheral region NAA, and thus may prevent a change in the driving signal of the signal line due to parasitic coupling. The guard electrode GD is disposed along the sensing electrode vulnerable to parasitic coupling caused by external factors which is disposed at an outer side in the active region AA, and thus may prevent the sensing electrode from falsely or erroneously recognizing a user's external input.

The guard electrode GD may buffer the occurrence of noise in the driving signal of the sensing electrode disposed adjacent to the guard electrode GD. The guard electrode GD may minimize a change in the driving signal applied to the sensing electrode due to factors other than a users external input.

The guard electrode GD and the guard line GL may reduce a ghost touch phenomenon occurring in a specific condition or environment. Ghost touch refers to a phenomenon in which an amplified noise signal in a region with no user external input, triggers a touch-mode operation. Therefore, in an embodiment of the present disclosure, the guard line GL and the guard electrode GD are disposed to provide an input sensing member ISP which is robust to noise, thereby achieving increased touch sensitivity and reliability of the input sensing member ISP.

FIGS. 7A and 7B each illustrate plan views of some components disposed on the same layer among components of the input sensing member ISP. For convenience of explanation, the first and second signal lines SL1-1 to SL1-5, SL2-1 to SL2-4 and the guard line GL disposed in the peripheral region NAA are illustrated in both FIGS. 7A and 7B. However, in an embodiment, the signal lines SL1-1 to SL1-5, SL2-1 to SL2-4 and the guard line GL may be formed in the first conductive layer IS-CL1 or the second conductive layer IS-CL2 of FIG. 3.

Referring to FIG. 7A, the first sensor portions SP1 and the first connection portions CP1 of the first sensing electrodes IE1-1 to IE1-5, second sensor portions SP2 of the second sensing electrodes IE2-1 to IE2-4, and the guard electrode GD may be disposed on the same layer. For example, in an embodiment, the first sensing electrodes IE1-1 to IE1-5, the second sensor portions SP2, and the guard electrode GD may be formed in the first conductive layer IS-CL1 or the second conductive layer IS-CL2 of FIG. 3.

The first sensor portions SP1 and the second sensor portions SP2 may be alternately arranged. The second sensor portions SP2 constituting one second sensing electrode and disposed on the same layer may be spaced apart from each other with the first connection portion CP1 therebetween in the first direction DR1 when viewed in a plane.

Referring to FIG. 7B, the second connection portions CP2 of the second sensing electrodes IE2-1 to IE2-4 may be disposed on a different layer from the first sensing electrodes IE1-1 to IE1-5, the second sensor portions SP2, and the guard electrode GD. The second connection portions CP2 may be connected to the second sensor portions SP2 that overlap thereof through a contact hole penetrating an insulating layer (e.g., the second insulating layer IS-IL2 of FIG. 3). The second connection portions CP2 may electrically connect the second sensor portions SP2 positioned adjacent to each other in the first direction DR1.

FIG. 7B illustrates the second connection portions CP2 having a curved shape. The second connection portions CP2 having the curved shape may overlap a portion of the first sensor portions SP1 and the second sensor portions SP2. However, embodiments of the present disclosure are not necessarily limited thereto, and the second connection portions CP2 may be disposed on a different layer from the first connection portions CP1 to be electrically insulated, and may have a shape that crosses the first connection portions CP1 when viewed in a plane.

In an embodiment, the first sensing electrodes IE1-1 to IE1-5 and the second sensing electrodes IE2-1 to IE2-4 may each have a mesh pattern shape. The mesh-shaped first sensing electrodes IE1-1 to IE1-5 and second sensing electrodes IE2-1 to IE2-4 may reduce parasitic capacitance with respect to the electrodes of the display panel DP. In addition, the first sensing electrodes IE1-1 to IE1-5 and second sensing electrodes IE2-1 to IE2-4 having the mesh shape may not overlap the light emitting region PXA described above, and may prevent the sensing electrodes from being visible outside of the electronic device ED.

The guard electrode GD may have a mesh pattern shape. Accordingly, a difference in visibility between a region in which the guard electrode GD is disposed and a region in which the first sensing electrodes IE1-1 to IE1-5 and the second sensing electrodes IE2-4 to IE2-4 are disposed may be prevented.

Figure 8A:
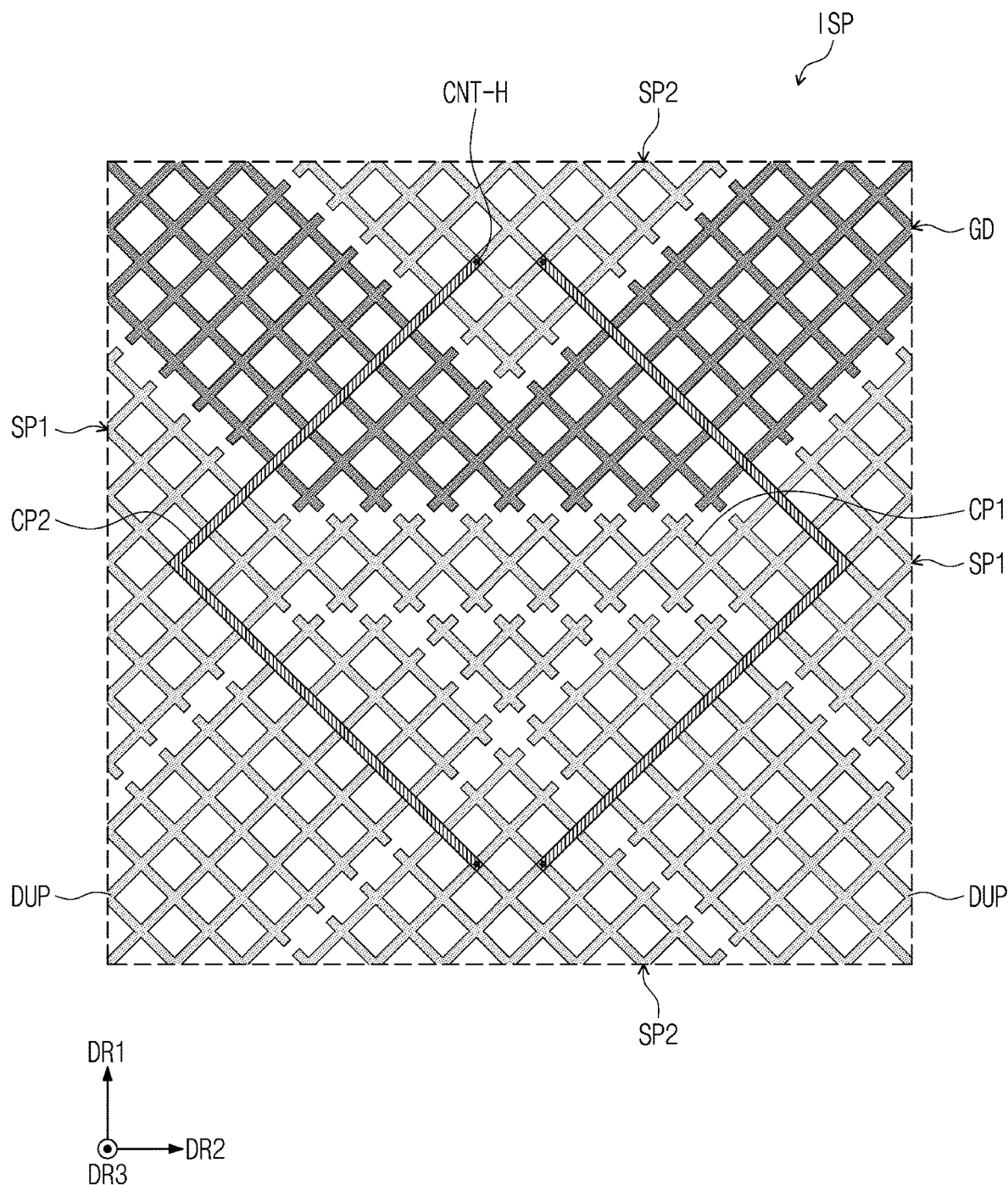
FIG. 8A is an enlarged plan view of an input sensing member according to an embodiment of the present disclosure.
Figure 8B:
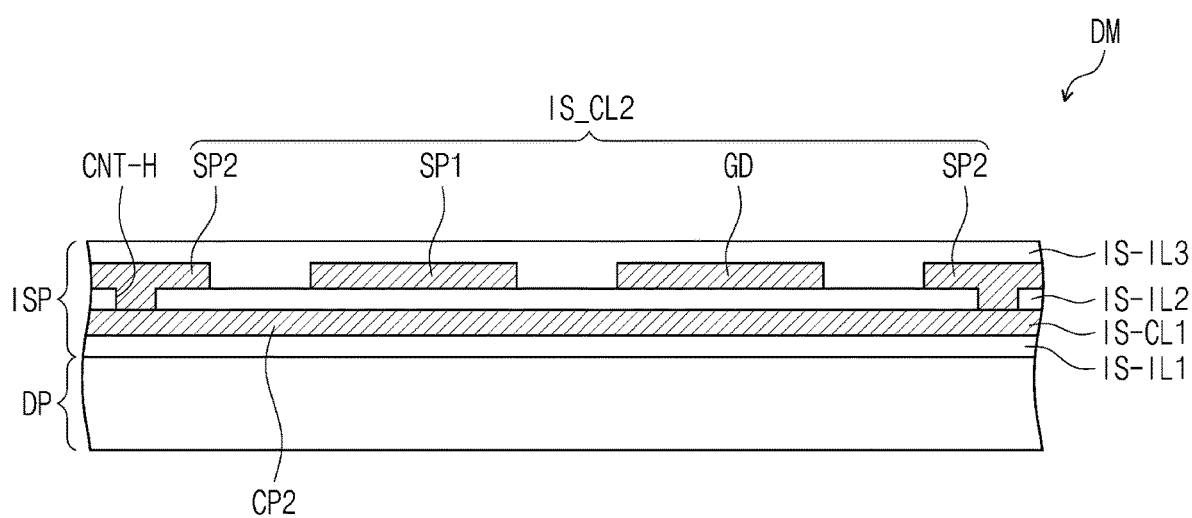
FIG. 8B is a cross-sectional view of a display module according to an embodiment of the present disclosure.

FIG. 8A is an enlarged plan view illustrating an input sensing member according to an embodiment. FIG. 8B is a cross-sectional view of a display module according to an embodiment. The above descriptions may be equally applied to respective components illustrated in FIGS. 8A and 8B and a repeated description of similar or identical elements may be omitted for convenience of explanation.

The plan view of the input sensing member ISP illustrated in FIG. 8A corresponds to a region in which the first connection portion CP1 and the second connection portion CP2 are disposed. The cross-sectional view of the display module DM illustrated in FIG. 8B corresponds to a region in which the second connection portion CP2 of the input sensing member ISP is disposed.

Referring to FIG. 8A, the first sensor portion SP1, the first connection portion CP1, the second sensor portion SP2, and the guard electrode GD disposed on the same layer may each have a mesh pattern shape. The guard electrode GD may be disposed along a boundary of the first sensor portions SP1 and the first connection portions CP1 disposed at the uppermost side (e.g., in the first direction DR1) of the first sensing electrode IE1-1 in the first row. In an embodiment, the second sensor portions SP2 disposed at the uppermost side among the second sensor portions SP2 may be disposed above (e.g., in the first direction DR1) the first sensor portions SP1 of the first sensing electrode IE1-1 (see to FIG. 7A) in the first row, and in this embodiment, the guard electrode GD may be disposed between a boundary of the uppermost second sensor portions SP2 and a boundary of the first sensor portions SP1 and the first connection portions CP1. However, embodiments of the present disclosure are not necessarily limited thereto, and the second sensor portions SP2 disposed at the uppermost side among the second sensor portions SP2 may be disposed below the first sensor portions SP1 of the first sensing electrode IE1-1 (see FIG. 7A) in the first row when viewed in a plane. In this embodiment, the guard electrode GD may be disposed at an uppermost side in the active region AA (see FIG. 7A) when viewed in a plane.

The second connection portions CP2 may each electrically connect two second sensor portions SP2 positioned adjacent to each other in the first direction DR1. The second connection portions CP2 may each be connected to the second sensor portions SP2 through the contact hole CNT-H formed through an insulating layer. The second connection portions CP2 may be electrically insulated from each other by an insulating layer from the first sensor portions SP1, the first connection portions CP1, and the guard electrode GD which overlap when viewed on a plane.

The input sensing member ISP according to an embodiment may further include dummy patterns DUP. The dummy patterns DUP may be disposed between the first sensing electrodes IE1-1 to IE1-5 and the second sensing electrodes IE2-1 to IE2-4 described above. For example, the dummy patterns DUP may be disposed between the first sensor portions SP1 and the second sensor portions SP2.

In an embodiment, the dummy patterns DUP may each be an electrically floating electrode. For example, the dummy patterns DUP may be patterns electrically insulated from the first sensing electrodes IE1-1 to IE1-5, the second sensing electrodes IE2-1 to IE2-4, and the guard electrode GD. The dummy patterns DUP may prevent a difference in visibility between a region in which the first sensing electrodes IE1-1 to IE1-5 and the second sensing electrodes IE2-4 to IE2-4 are disposed and a region in which the first sensing electrodes IE1-1 to IE1-5 and the second sensing electrodes IE2-1 to IE2-4 are not disposed. The dummy patterns DUP may reduce parasitic capacitance. In an embodiment, some of the dummy patterns DUP may be disposed between the guard electrode GD and the second sensor portions SP2 disposed at the uppermost side. However, embodiments of the present disclosure are not limited thereto, and the dummy patterns DUP may be omitted.

Referring to FIG. 8B, the input sensing member ISP may include first to third insulating layers IS-IL1 to IS-IL3 and first and second conductive layers IS-CL1 and IS-CL2, which are alternately stacked (e.g., in the third direction DR3). Descriptions of the insulating layer and the conductive layer of the input sensing member ISP may be the same as described above with reference to FIG. 3 and a repeated description of similar or identical elements may be omitted for convenience of explanation.

The first conductive layer IS-CL1 may be disposed on the first insulating layer IS-IL1 (e.g., directly thereon in the third direction DR3) and may include the second connection portions CP2. For example, the second connection portions CP2 may be directly disposed on the first insulating layer IS-IL1 (e.g., in the third direction DR3). However, embodiments of the present disclosure are not necessarily limited thereto. For example, in an embodiment, the first insulating layer IS-IL1 may be omitted, and the second connection portions CP2 may be directly disposed on the display panel DP.

The second insulating layer IS-IL2 may be disposed on the second connection portions CP2 (e.g., directly thereon in the third direction DR3). Contact holes CNT-H are formed through the second insulating layer IS-IL2.

The second conductive layer IS-CL2 may be disposed on the second insulating layer IS-IL2 (e.g., directly thereon in the third direction DR3), and may include the first sensor portions SP1, the first connection portions CP1 (see FIG. 8A), the second sensor portions SP2, and the guard electrode GD. When viewed from a cross-section, the first sensor portions SP1, the second sensor portions SP2, and the guard electrode GD may be spaced apart from each other and may be electrically insulated from each other.

The contact holes CNT-H may be formed in a region where the second sensor portions SP2 and the second connection portions CP2 overlap each other (e.g., in the third direction DR3), and the second sensor portions SP2 and the second connection portions CP2 may be electrically connected through the contact holes CNT-H. Accordingly, the second sensor portions SP2 spaced apart from each other with the first sensor portion SP1 and the guard electrode GD therebetween when view from a cross-section may be electrically connected to each other through the second connection portions CP2.

The first sensor portion SP1 and the guard electrode GD may be spaced apart from the second connection portion CP2 with the second insulating layer IS-IL2 therebetween in a thickness direction. The first sensor portion SP1 and the guard electrode GD may be electrically insulated from the second connection portion CP2.

The third insulating layer IS-IL3 may be disposed on the second conductive layer IS-CL2 (e.g., directly thereon in the third direction DR3). The third insulating layer IS-IL3 may cover the first sensor portions SP1, the first connection portions CP1 (see FIG. 8A), the second sensor portions SP2, and the guard electrode GD, and may provide a flat upper surface.

However, the input sensing member ISP according to embodiment of the present disclosure are not necessarily limited to the one illustrated in FIG. 8B. For example, in an embodiment, the first conductive layer IS-CL1 may include the first sensor portions SP1, the first connection portions CP1 (see FIG. 8A), the second sensor portions SP2, and the guard electrode GD, and the second conductive layer IS-CL2 may include the second connection portions CP2.

Figure 9:
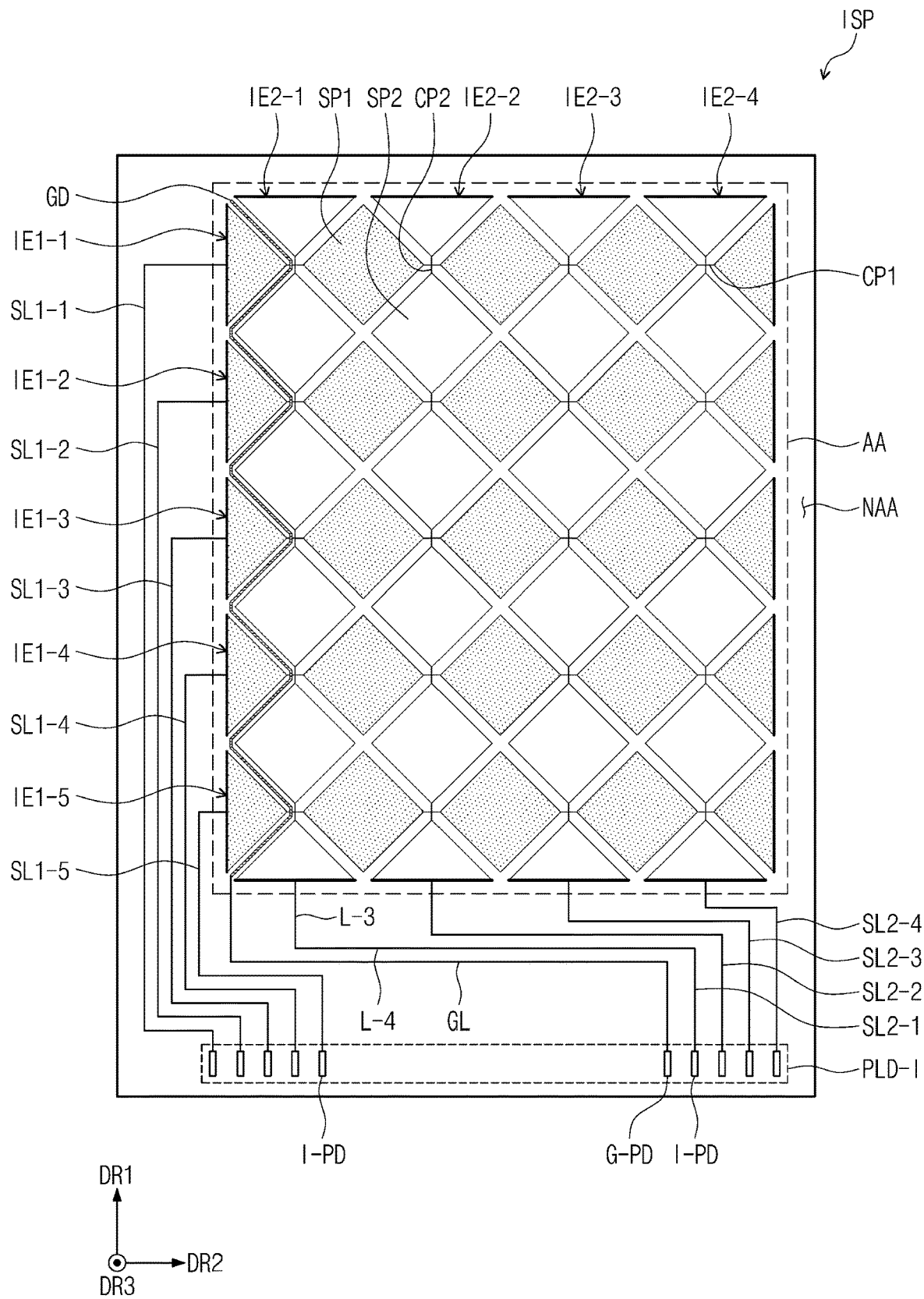
FIG. 9 is a plan view of an input sensing member according to an embodiment of the present disclosure.
Figure 10A:
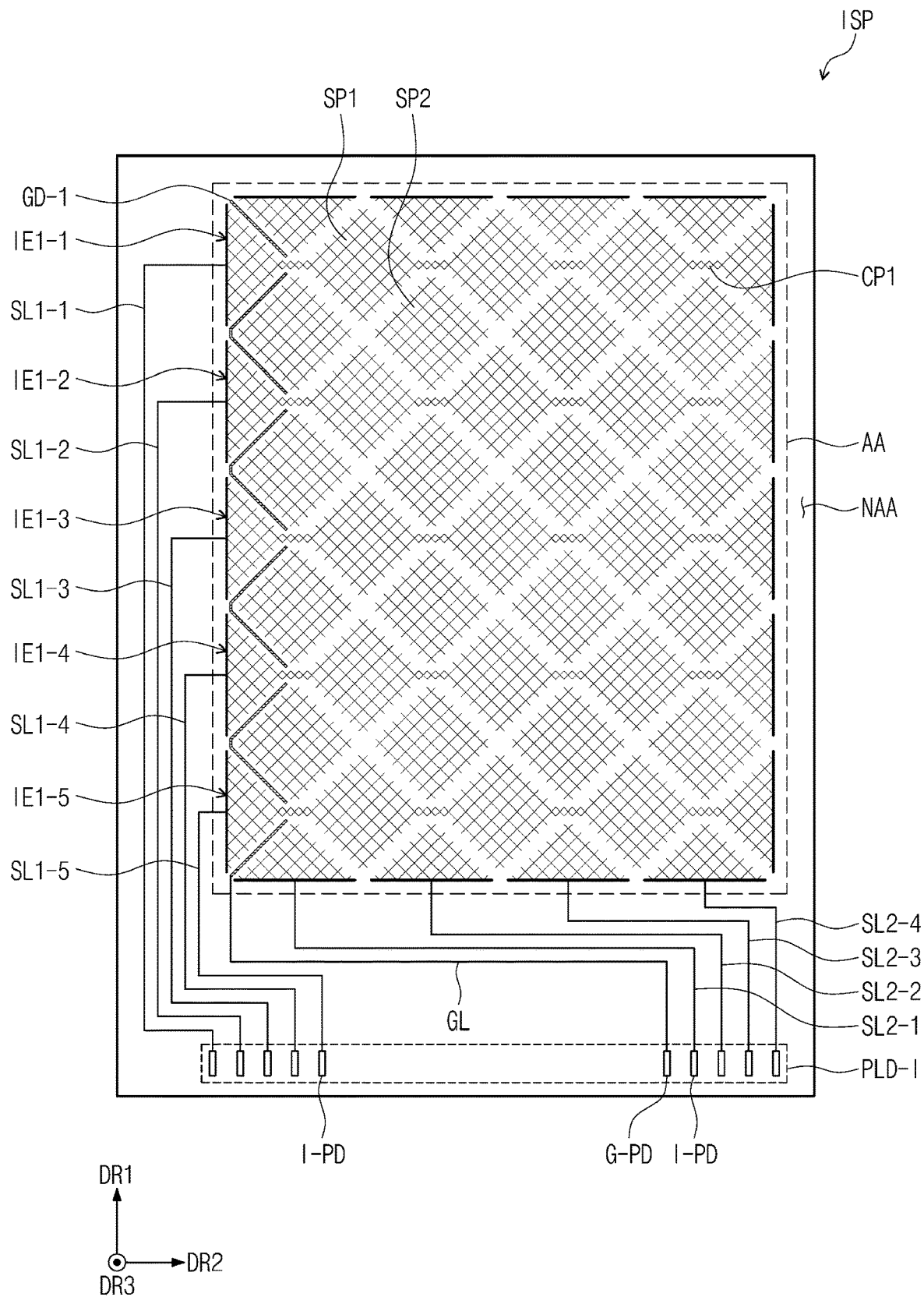
FIGS. 10A and 10B are plan views illustrating some components of an input sensing member according to embodiments of the present disclosure.
Figure 10B:
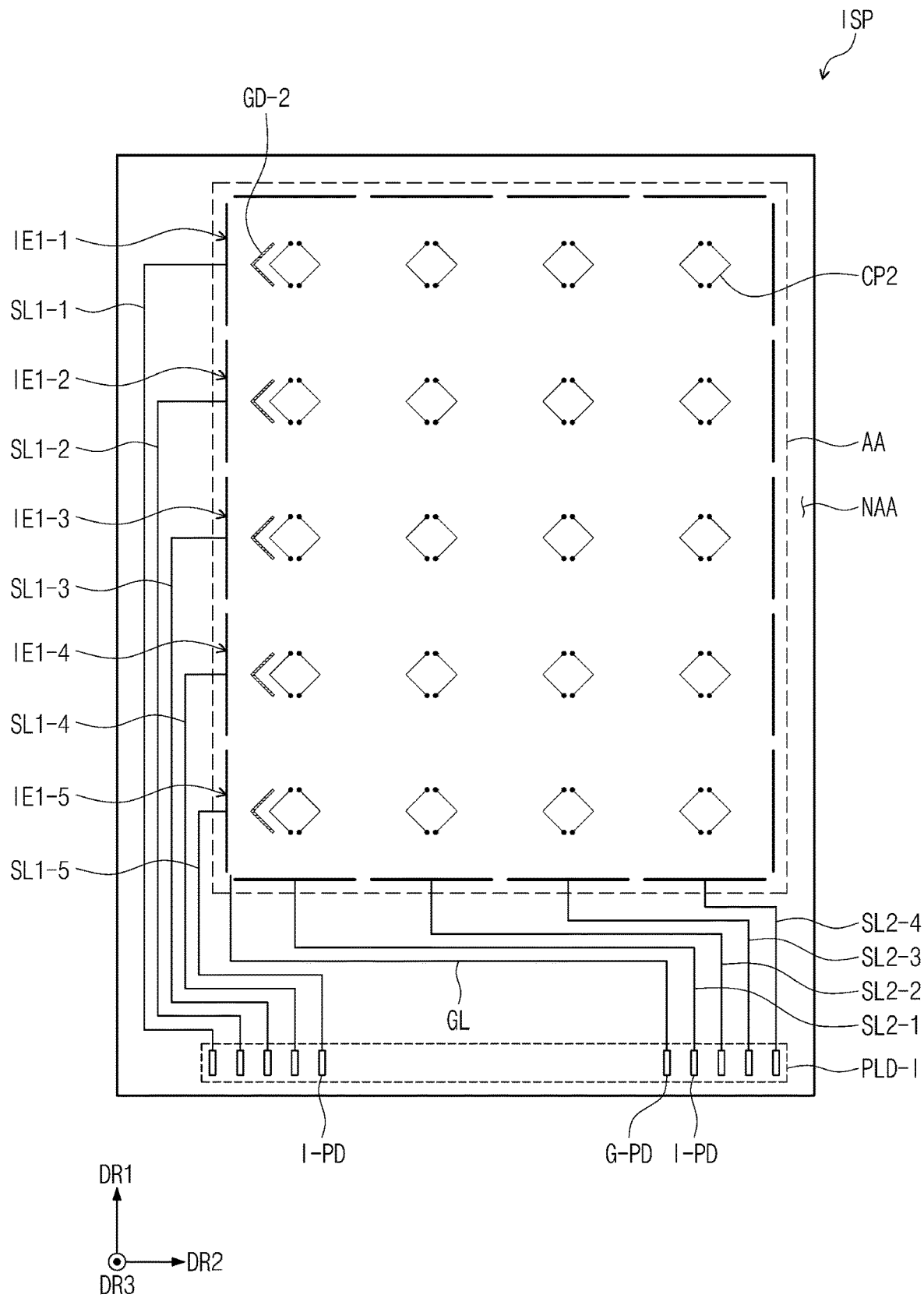

FIG. 9 is a plan view of an input sensing member according to an embodiment. FIGS. 10A and 10B are plan views illustrating some components of the input sensing member of FIG. 9.

Components of the input sensing member ISP illustrated in FIG. 9 are substantially the same as those of the embodiment illustrated in FIG. 6, and descriptions of respective components may be equally applied. However, the input sensing member ISP of an embodiment illustrated in FIG. 9 has some differences in the arrangement of the guard electrode GD and the guard line GL when compared to the input sensing member ISP of an embodiment illustrated FIG. 6. Hereinafter, the differences will be mainly discussed with reference to the accompanying drawings and a repeated description of similar or identical elements may be omitted for convenience of explanation.

Referring to FIG. 9, among the second sensing electrodes IE2-1 to IE2-4 arranged in m columns, the second sensing electrode IE2-1 arranged at the leftmost side in the second direction DR2 may be defined as a first column, and the second sensing electrode IE2-4 arranged at the rightmost side may be defined as an m-th column (e.g., a fourth column in FIG. 9). In an embodiment, the second sensing electrode IE2-1 in the first column among the second sensing electrodes IE2-4 to IE2-4 (hereinafter, a "first column second sensing electrode") may be disposed farthest away from the input pads I-PD electrically connected to each of the second sensing electrodes IE2-1 to IE2-4. However, embodiments of the present disclosure are not necessarily limited thereto, and the distance between the second sensing electrodes IE2-1 to IE2-4 and the input pads I-PD connected thereto may vary depending on the arrangement position and arrangement of the input pads I-PD.

The guard electrode GD may be disposed adjacent to the outermost-positioned second sensing electrode among the second sensing electrodes IE2-4 to IE2-4 in the active region AA. Referring to FIG. 9, the guard electrode GD may be disposed around the leftmost second sensing electrode IE2-4 (hereinafter, the second sensing electrode IE2-1 in the first column or a "first column second sensing electrode") among the second sensing electrodes IE2-1 to IE2-4 in the second direction DR2. However, embodiments of the present disclosure are not limited thereto. For example, in an embodiment, the rightmost second sensing electrode IE2-4 in the second direction DR2 among the second sensing electrodes IE2-1 to IE2-4 may be disposed farthest away from the input pads I-PD, and the guard electrode GD may be disposed around the rightmost second sensing electrode IE2-4.

The guard electrode GD disposed adjacent to the second sensing electrode IE2-1 in the first column may extend along an extension direction of the second sensing electrode IE2-1 (e.g., the first direction DR1 in an embodiment of FIG. 9). The guard electrode GD may be disposed at the outermost side of the second sensing electrode IE2-1 in the first column in the second direction DR2.

The guard electrode GD may not be disposed between the second sensing electrodes IE2-1 to IE2-4 when viewed in a plane, but may be spaced apart from the second sensing electrode IE2-2 in a second column with the second sensing electrode IE2-1 in the first column therebetween. In an embodiment in which the guard electrode GD is disposed outside the second sensing electrode disposed at the outermost side, the guard electrode GD may not affect the detection of mutual capacitance variation formed between the sensing electrodes, and may also increase the touch sensitivity of the sensing electrode disposed in an outer region.

The guard electrode GD may be disposed along an outermost boundary of the second sensing electrode IE2-1 in the first column. In an embodiment, the shape of the guard electrode GD may correspond to the shape of the outermost boundary of the second sensing electrode IE2-1. The guard electrode GD may be disposed along a boundary of the second sensor portions SP2 and the second connection portions CP2 of the second sensing electrode IE2-1 in the first column.

The guard electrode GD may be electrically insulated from the first sensing electrodes IE1-1 to IE1-5 and the second sensing electrodes IE2-1 to IE2-4. For example, the guard electrode GD may be disposed to be spaced apart from the second sensor portions SP2 and the second connection portions CP2 of the second sensing electrode IE2-1 in the first row when viewed in a plane.

In an embodiment, some of the first sensor portions SP1 of the first sensing electrodes IE1-1 to IE1-5 may be disposed farther to the left (e.g., in the second direction DR2) than the second sensing electrode IE2-1 in the first column. In this embodiment, the guard electrode GD may be disposed to be spaced apart between the second sensing electrode IE2-1 in the first column and the first sensor portions SP1 disposed at the leftmost side. However, embodiments of the present disclosure are not necessarily limited thereto. For example, in an embodiment, the second sensing electrode IE2-1 in the first column among the sensing electrodes may be disposed at the leftmost side, and in this embodiment, the guard electrode GD may be disposed at the outermost side along the second sensing electrode IE2-1 in the first column in the active region AA.

The guard line GL may be connected to the guard electrode GD in the same direction as the connection direction of the second signal line SL2-1 (hereinafter referred to as the second signal line SL2-1 of the first column) connected to the second sensing electrode IE2-1 in the first column. Referring to FIG. 9, like the second signal line SL2-1 of the first column, the guard line GL may be connected to a lower end of the guard electrode GD (e.g., in the first direction DR1).

The guard line GL may be disposed around a signal line extending longest from the input pads I-PD among the second signal lines SL2-1 to SL2-4. Referring to FIG. 9, the input pads I-PD connected to the second signal lines SL2-1 to SL2-4 may be disposed adjacent to a lower right end, and the distances between points where the second sensing electrodes IE2-1 to IE2-4 and the second signal lines SL2-1 to SL2-4 are connected, respectively, to the input pads I-PD may vary for each of the second sensing electrodes IE2-1 to IE2-4.

Referring to FIG. 9, the distance between the point where the second sensing electrode IE2-1 in the first column and the second signal line SL2-1 is connected to the input pad I-PD may be greatest for the second sensing electrode IE2-1 in the first column among the second sensing electrodes IE2-1 to IE2-4. Accordingly, the second signal line SL2-1 of the first column may be the longest among the second signal lines SL2-1 to SL2-4 and the length of the second signal lines SL2-1 to SL2-4 may get progressively smaller from each other. However, embodiments of the present disclosure are not limited thereto, and the lengths of the second signal lines SL2-1 to SL2-4 may vary depending on the arrangement positions of the input pads I-PD.

The second signal lines SL2-1 to SL2-4 each may include a third line portion L-3 extending in the first direction DR1 from a first side of the corresponding second sensing electrode IE2-1 to IE2-4, and a fourth line portion L4 extending in the second direction DR2 from the end of the third line portion L-3 towards the input pad I-PD. FIG. 9 illustrates the third line portion L-3 and the fourth line portion L4 of the second signal line SL2-1 of the first column. In an embodiment, the fourth line portion L-4 of the second signal line SL2-1 in the first column may be the longest among the fourth line portions of the second signal lines SL2-1 to SL2-4.

The guard line GL may be disposed around the second signal line, which is the longest among the second signal lines SL2-1 to SL2-4 when viewed in a plane. Referring to FIG. 9, the guard line GL may be disposed adjacent along the second signal line SL2-1 of the first column, which is the longest among the second signal lines SL2-1 to SL2-4. The guard line GL may not be disposed between the second signal lines SL2-1 to SL2-4. Accordingly, the guard line GL may be spaced apart from the second signal line SL2-2 of the second column with the second signal line SL2-1 of the first column therebetween.

The second signal line SL2-1 of the first column, which is the longest among the second signal lines SL2-1 to SL2-4 may be relatively vulnerable to coupling by peripheral conductive patterns of the display panel DP, and may have parasitic coupling. In the second sensing electrode IE2-1 in the first column receiving driving signals from the second signal line SL2-1 of the first column, the driving signal levels may increase due to parasitic coupling. In addition, parasitic coupling may occur in the second sensing electrode IE2-1 due to conductive patterns such as the common electrode of the display panel DP disposed in the active region AA.

In an embodiment, the same signal as the driving signal applied to the second signal line SL2-1 of the first column disposed adjacent to the guard line GL may be applied to the guard line GL, and the signal may be transmitted to the guard electrode GD. The guard line GL and the guard electrode GD may prevent the driving signal levels of the signal line and the sensing electrode, which are relatively vulnerable to coupling due to external factors from increasing. In an embodiment of the present disclosure, the guard line GL and the guard electrode GD may provide an input sensing member ISP that is robust to noise and has increased touch sensitivity.

FIGS. 10A and 10B are each plan views of some components disposed on the same layer among components of the input sensing member ISP. The components illustrated in FIGS. 10A and 10B are substantially the same as the components illustrated in FIGS. 7A and 7B, and the above descriptions may be equally applied. However, the arrangement of the guard electrode GD illustrated in FIGS. 10A and 10B is slightly different from embodiments illustrated in FIGS. 7A and 7B, and the differences will be mainly discussed later and a repeated description of similar or identical elements may be omitted for convenience of explanation.

Referring to FIGS. 10A and 10B, the second sensor portions SP2 of the second sensing electrodes IE2-1 to IE2-4 may be disposed on a layer different from that of the second connection portions CP2. Accordingly, the guard electrode GD disposed along the second sensing electrode IE2-1 in the first column may also include portions disposed on different layers and electrically connected to each other.

Referring to FIG. 10A, the guard electrode GD may include first portions GD-1 disposed on the same layer as the second sensor portions SP2 of the second sensing electrode IE2-1 in the first column. The first portions GD-1 of the guard electrode GD may be disposed along the boundary of the second sensor portions SP2 of the second sensing electrode IE2-1 in the first column. For example, in an embodiment, the second sensor portions SP2 may each have a diamond shape, and the first portions GD-1 of the guard electrode GD may have a curved shape corresponding to the diamond shape.

Referring to FIG. 10B, the guard electrode GD may include second portions GD-2 disposed on the same layer as the second connection portions CP2 of the second sensing electrode IE2-1 in the first column. The second portions GD-2 of the guard electrode GD may be disposed on different layers from the first portions GD-1. The second portions GD-2 may each electrically connect first portions GD-1 positioned adjacent to each other in the first direction DR1. The second portions GD-2 may be electrically connected to the first portions GD-1 through a contact hole penetrating an insulating layer.

The second portions GD-2 may be disposed along the boundary of the second connection portions CP2 of the second sensing electrode IE2-1 in the first column. For example, the second connection portions CP2 may have a curved shape, and the second portions GD-2 may be disposed outside the second connection portions CP2, and may have a curved shape corresponding to shape of the second connection portions CP2. However, embodiments of the present disclosure are not limited thereto, and the second portions GD-2 of the guard electrode GD may have a straight line shape when viewed in a plane. For example, provided that the second portions GD-2 are in the shape that is insulated from the second connection portions CP2 and electrically connected to the first portions GD-1 of the guard electrode GD, the shape is not limited to any one embodiment.

Figure 11:
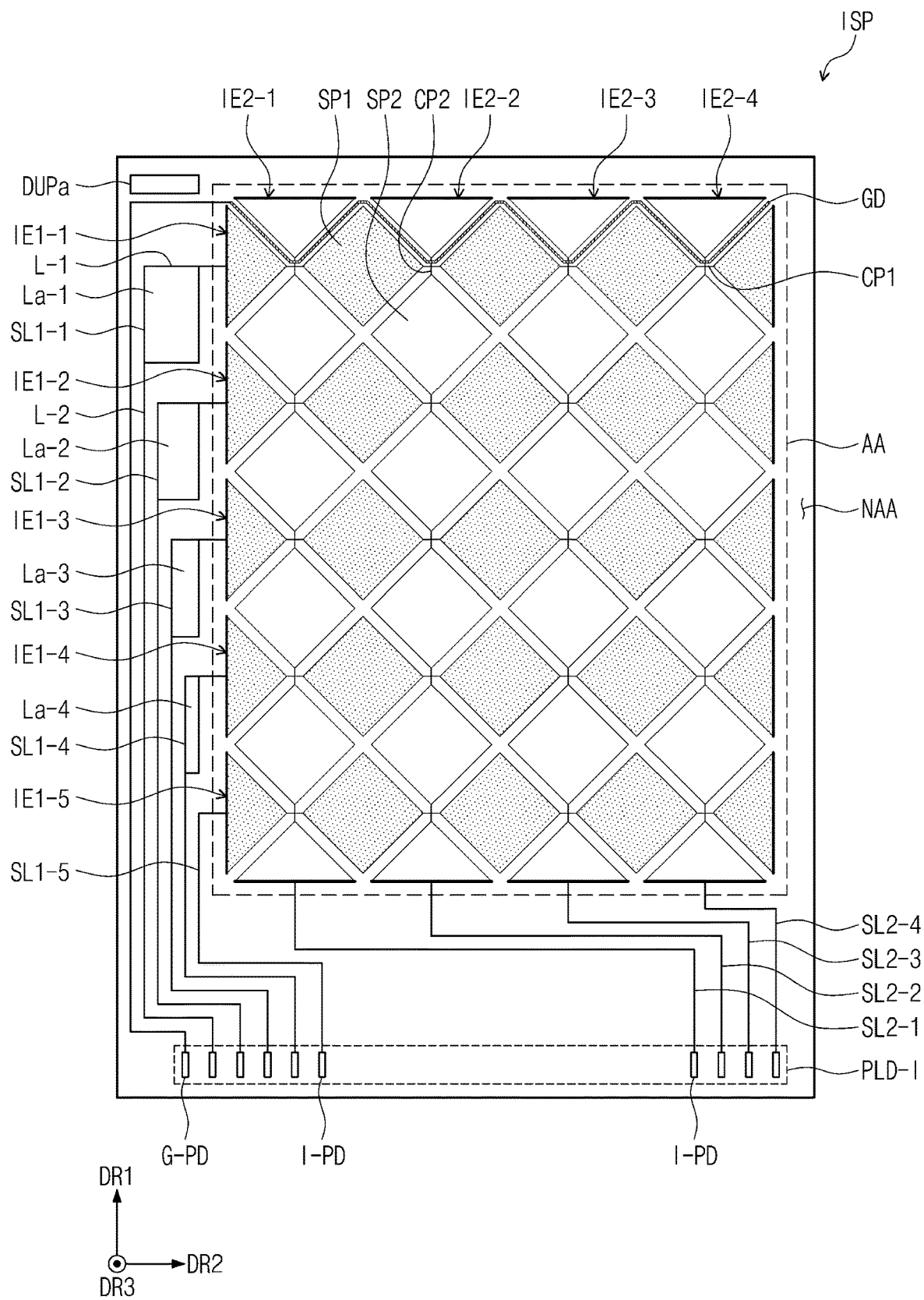
FIG. 11 is a plan view of an input sensing member according to an embodiment of the present disclosure.

FIG. 11 is a plan view of an input sensing member according to an embodiment. Components of the input sensing member ISP illustrated in FIG. 11 are substantially the same as those of an embodiment illustrated in FIG. 6, and descriptions of respective components may be equally applied. However, the input sensing member ISP of an embodiment illustrated in FIG. 11 has some differences in the shape of the signal line when compared to the embodiment of FIG. 6. Hereinafter, the differences will be mainly discussed with reference to FIG. 11 and a repeated description of similar or identical elements may be omitted for convenience of explanation.

The signal lines of the input sensing member ISP according to an embodiment may include a portion formed as a single body together with the line portion and having a predetermined planar area. Referring to FIG. 11, at least some of the first signal lines SL1-1 to SL1-5 may further include portions La-1 to La-4 (hereinafter, referred to as planar portions) having a predetermined planar area (e.g., in the first and second directions DR1, DR2). FIG. 1I illustrates the planar portions La-1 to La-4 of the first signal lines SL1-1 to SL1-4 of the first to fourth rows as an example. However, embodiments of the present disclosure are not limited thereto, and all of the first signal lines SL1-1 to SL1-5 may include planar portions having a predetermined planar area.

With respect to the first signal line SL1-1 of the first row, the planar portion La-1 of the first signal line SL1-1 may be shaped as a single body with the first line portion L-1 and/or the second line portion L-2 described above. The first line portion L-1 may extend from the planar portion La-1 in the second direction DR2 towards a first side of the first sensing electrode IE1-1 in the first column. The second line portion L-2 may correspond to a portion extending from the planar portion La-1 towards the input pad I-PD in the first direction DR1. Although the descriptions are made solely with respect to the first signal line SL1-1 of the first row, the above descriptions may also be applied to other first signal lines.

Areas of the planar portions La-1 to La-4 of the first signal lines SL1-1 to SL1-5 may be different from each other. For example, in an embodiment, an area of the planar portion La-1 of the first signal line SL1-1 of the first row and an area of the planar portion La-2 of the first signal line SL1-2 of the second row may be different from each other. In an embodiment, the area of the planar portions La-1 to La-4 may get progressively less from each other.

Greater length of the first signal lines SLA-1 to SL1-5 may increase areas of the planar portions La-1 to La-4. For example, the area of the planar portion La-1 of the first signal line SL1-1 of the first row, which is the longest among the first signal lines SL1-A to SL1-5 may be the largest among the planar portions of the first signal lines SL1-1 to SL1-5.

A signal line having a relatively long wiring may have an increase in resistance, and thus charges may be accumulated to form a capacitor. However, in an embodiment, the signal line includes a planar portion having a predetermined planar area, and thus prevent the accumulation of electric charges, and accordingly may prevent an incidental capacitor from being formed in the signal line. Accordingly, the signal line further includes the planar portion, and thus the driving signal or the output signal may be more smoothly transmitted through the signal line.

The input sensing member ISP according to an embodiment may further include a dummy pattern DUPa disposed in the peripheral region NAA. The dummy pattern DUPa may be an electrically floating electrode. The dummy pattern DUPa may reduce the occurrence of parasitic capacitance caused when wirings placed in the peripheral region NAA affect each other.

The guard line GL may be disposed between the first signal line SL1-1 of the first row and the dummy pattern DUPa. The guard line GL may shield the first signal line SL1-1 of the first row disposed at the outermost side among the first signal lines SL1-1 to SL1-5 from being affected by the dummy pattern DUPa, and may prevent undesired coupling with the dummy pattern DUPa.

Figure 12A:
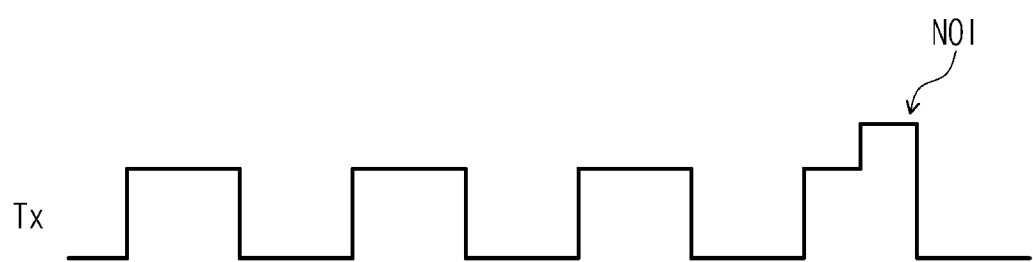
FIG. 12A is a diagram illustrating waveforms of driving signals applied to a sensing electrode of Comparative Example.
Figure 12B:
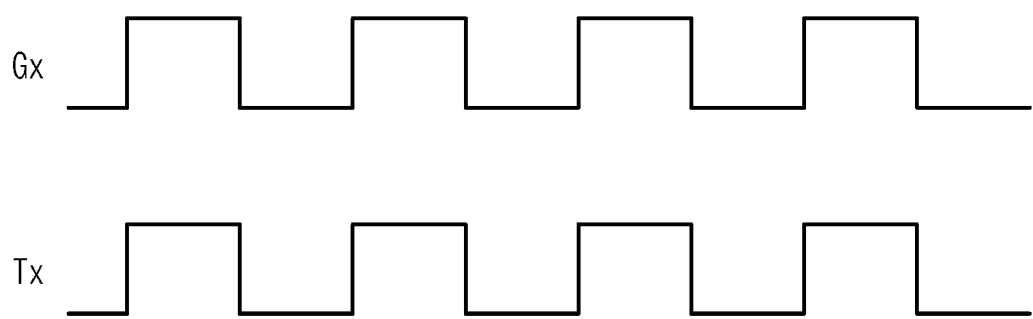
FIG. 12B is a diagram illustrating waveforms of signals applied to a guard electrode and driving signals applied to a sensing electrode according to an embodiment of the present disclosure.

FIG. 12A is a view, as an example, illustrating waveforms of driving signals applied to a sensing electrode of Comparative Example. FIG. 12B is a view illustrating waveforms of signals applied to a guard electrode and driving signals applied to a sensing electrode according to an embodiment of the present disclosure.

The first or second sensing electrodes described above may be driven as an input electrode, and a driving signal Tx may be input into the input electrode. The driving signal according to an embodiment may have various waveforms and voltage levels. For example, the driving signal may have pulses output periodically which may have different voltage levels. However, embodiments of the present disclosure are not necessarily limited thereto. Referring to FIGS. 12A and 12B, in an embodiment, the driving signal Tx applied to a sensing electrode may include pulses that have the same level and are periodically output.

Among the first sensing electrodes and second sensing electrodes described above, other than the sensing electrodes driven as the input electrode, the remaining sensing electrodes may be driven as an output electrode. As the capacitance between the input electrode and the output electrode is changed due to external inputs, the capacitance variation may be detected, and based on this, the input sensing member may detect external inputs.

When the signal line connected to the sensing electrodes has a greater length or area, there may be greater chance of unexpected coupling with the components of other conductive patterns of an electronic device. For example, as illustrated in FIG. 12A, parasitic coupling may occur in the signal line and the sensing electrode of the input sensing member due to unexpected coupling, and accordingly, an increase in the level of a portion NOI of the driving signal Tx applied to the signal line and the sensing electrode may occur. With the changes in the driving signal Tx, noise other than a user's external input may be detected, and thus, the touch sensitivity of the input sensing member may be reduced.

As illustrated in FIG. 12B, in an embodiment of the present disclosure, an input sensing member includes the guard electrode and the guard line. A signal Gx having the same phase as the driving signal Tx applied to the signal line and the sensing electrode disposed adjacent to the guard electrode and the guard line may be applied to the guard line. Accordingly, the parasitic coupling caused by external factors may be prevented in the sensing electrode, and the level of the driving signal Tx may become even. The guard electrode and the guard line may prevent noise generation to increase the touch sensitivity of the input sensing member.

An input sensing member according to an embodiment of the present disclosure may include a guard electrode and a guard line, and the guard electrode and the guard line may be disposed along a sensing electrode and a signal line connected to the sensing electrode vulnerable to parasitic coupling among sensing electrodes and signal lines. The same signal as the driving signal applied to the sensing electrode disposed adjacent to the guard electrode and the signal line connected thereto may be applied to the guard electrode and the guard line, and the guard electrode and the guard line may compensate for a change in the driving signal level, which is caused by parasitic coupling. Accordingly, embodiments of the present disclosure may provide an input sensing member that is robust to noise and has increased touch sensitivity.

According to an embodiment of the present disclosure, a guard electrode disposed in an active region is provided, and thus signal distortion due to parasitic coupling capacitance of touch wiring may be minimized and touch sensitivity may not be reduced.

Although embodiments of the present disclosure have been described, it will be understood that the present disclosure should not be limited to these embodiments but various changes and modifications can be made by those skilled in the art without departing from the spirit and scope of the present disclosure.

What is claimed is:

1. An electronic device comprising:
a display panel including a display region and a non-display region; and
an input sensing member disposed on the display panel, wherein the input sensing member includes:
first sensing electrodes arranged in n rows along a first direction;
second sensing electrodes crossing the first sensing electrodes and arranged in m columns along a second direction, wherein n and m are each a natural number greater than or equal to 2;
first signal lines respectively connected to the first sensing electrodes;
second signal lines respectively connected to the second sensing electrodes;
a guard electrode solely disposed between an outer side of a first row first sensing electrode that is disposed in a first row among the first sensing electrodes and inner sides of a plurality of the second sensing electrodes or between an outer side of a first column second sensing electrode that is disposed in a first column among the second sensing electrodes and inner sides of a plurality of the first sensing electrodes, the guard electrode disposed along the first row first sensing electrode does not extend between adjacent first sensing electrodes of the first sensing electrodes and the guard electrode disposed along the first column second sensing electrode does not extend between adjacent second sensing electrodes of the second sensing electrodes; and
a guard line electrically connected to the guard electrode, wherein the guard electrode is electrically insulated from the first sensing electrodes and the second sensing electrodes.

2. The electronic device of claim 1, wherein:
each of the first sensing electrodes extends along the second direction; and
the guard electrode is disposed along a boundary of the first row first sensing electrode and extends along the second direction.

3. The electronic device of claim 2, wherein the guard electrode is spaced apart from a second row first sensing electrode that is disposed in a second row adjacent to the first row among the first sensing electrodes, and the first row first sensing electrode is disposed between the guard electrode and the second row first sensing electrode when viewed in a plane.

4. The electronic device of claim 2, wherein:
the input sensing member further comprises input pads overlapping the non-display region;
first ends of the first signal lines are respectively connected to first sides of the first sensing electrodes, and second ends of the first signal lines are each connected to a corresponding input pad among the input pads; and
a first end of the guard line is connected to the guard electrode, and a second end of the guard line is connected to a corresponding input pad among the input pads.

5. The electronic device of claim 4, wherein the first row first sensing electrode is disposed farthest away from the input pads in the first direction than all other first sensing electrodes.

6. The electronic device of claim 5, wherein:
a first row first signal line that is connected to the first row first sensing electrode is disposed at an outermost side among the first signal lines; and
the guard line is disposed outside the first row first signal line.

7. The electronic device of claim 6, wherein:
each of the first signal lines includes a line portion extending along the first direction; and
the line portion of the first row first signal line has a largest length than all other line portions of the first signal lines.

8. The electronic device of claim 7, wherein:
at least some of the first signal lines further comprise a planar portion connected to the line portion and having a predetermined planar area; and
the planar portions of the at least some of the first signal lines have different planar areas from each other.

9. The electronic device of claim 8, wherein the planar portion of the first row first signal line has a largest planar area than all other of the planar portions of the at least some of the first signal lines.

10. The electronic device of claim 6, wherein a signal applied to the guard line is a same signal as a signal applied to the first row first signal line.

11. The electronic device of claim 6, wherein the input sensing member further comprises a dummy pattern overlapping the non-display region and disposed adjacent to the first row first signal line,
wherein the dummy pattern is spaced apart from the first row first signal line and the guard line is disposed between the dummy pattern and the first row first signal line when viewed in a plane.

12. The electronic device of claim 1, wherein:
each of the second sensing electrodes extends along the first direction; and
the guard electrode is disposed along a boundary of the first column second sensing electrode and extends along the first direction.

13. The electronic device of claim 12, wherein:
the guard electrode is spaced apart from a second column second sensing electrode that is disposed in a second column adjacent to the first column among the second sensing electrodes; and
the first column second sensing electrode is disposed between the guard electrode and the second column second sensing electrode when viewed in a plane.

14. The electronic device of claim 1, wherein the guard electrode comprises a mesh pattern.

15. The electronic device of claim 1, wherein the input sensing member further comprises dummy patterns disposed between the first sensing electrodes and the second sensing electrodes.

16. An electronic device comprising:
a display panel; and
an input sensing member disposed on the display panel, wherein the input sensing member includes:
first sensing electrodes arranged along a first direction, and each extending along a second direction crossing the first direction;
second sensing electrodes arranged along the second direction, and each extending along the first direction;
first signal lines respectively connected to the first sensing electrodes;
second signal lines respectively connected to the second sensing electrodes;

a guard electrode solely disposed between an outer side of an outermost first sensing electrode that is disposed at an outermost side in the first direction among the first sensing electrodes and inner sides of a plurality of the sec sing electrodes, wherein the guard electrode does not extend between adjacent first sensing electrodes of the first sensing electrodes; and
a guard line electrically connected to the guard electrode, wherein a signal applied to the guard line is a same signal as a signal that is applied to an outermost first signal line that is connected to the outermost first sensing electrode among the first signal lines.

17. The electronic device of claim 16, wherein the outermost first sensing electrode comprises:
sensor portions arranged along the second direction; and
connection portions disposed on a same layer as the sensor portions, each of the connection portions connecting adjacent sensor portions, and
the guard electrode is disposed along a first side of the sensor portions and the connection portions.

18. The electronic device of claim 16, wherein the outermost first sensing electrode comprises:
sensor portions arranged along the second direction; and
connection portions overlapping the sensor portions when viewed in a plane, each of the connection portions electrically connecting adjacent sensor portions, and
the guard electrode comprises:
first portions disposed along a first side of the sensor portions; and
second portions each overlapping adjacent first portions when viewed in a plane, each of the second portions electrically connecting the adjacent first portions.

19. The electronic device of claim 16, wherein:
the outermost first signal line is disposed at an outermost side among the first signal lines; and
the guard line is disposed outside the outermost first signal line.

20. The electronic device of claim 16, wherein:
the input sensing member further comprises input pads each connected to a corresponding line among the first signal lines, the second signal lines, and the guard line;
first ends of the first signal lines are respectively connected to first sides of the first sensing electrodes, and second ends are respectively connected to the input pads; and
the outermost first signal line has a largest length than all other of the first signal lines.

* * * * *